US008387122B2

(12) United States Patent
Toomim et al.

(10) Patent No.: US 8,387,122 B2
(45) Date of Patent: Feb. 26, 2013

(54) ACCESS CONTROL BY TESTING FOR SHARED KNOWLEDGE

(75) Inventors: Michael Toomim, Seattle, WA (US); James Fogarty, Seattle, WA (US); James Landay, Seattle, WA (US); Nathan Morris, Seattle, WA (US); Xianhang Zhang, Seattle, WA (US); Tadayoshi Kohno, Seattle, WA (US)

(73) Assignee: University of Washington, Seattle, WA (US)

( * ) Notice: Subject to any disclaimer, the term of this patent is extended or adjusted under 35 U.S.C. 154(b) by 835 days.

(21) Appl. No.: 12/466,242

(22) Filed: May 14, 2009

(65) Prior Publication Data

US 2009/0288150 A1 Nov. 19, 2009

Related U.S. Application Data

(60) Provisional application No. 61/053,777, filed on May 16, 2008, provisional application No. 61/148,329, filed on Jan. 29, 2009.

(51) Int. Cl.
*H04L 9/00* (2006.01)
*G06F 21/00* (2006.01)
(52) U.S. Cl. ............................................ 726/5; 713/183
(58) Field of Classification Search ....... 726/5; 713/183
See application file for complete search history.

(56) References Cited

U.S. PATENT DOCUMENTS

| | | | | |
|---|---|---|---|---|
| 4,604,694 | A * | 8/1986 | Hough | 710/200 |
| 6,934,860 | B1 * | 8/2005 | Goldstein | 713/183 |
| 2005/0039057 | A1 * | 2/2005 | Bagga et al. | 713/202 |
| 2008/0313721 | A1 * | 12/2008 | Corella | 726/6 |
| 2009/0025080 | A1 * | 1/2009 | Lund et al. | 726/15 |
| 2009/0158399 | A1 * | 6/2009 | Cooley et al. | 726/4 |

OTHER PUBLICATIONS

Demchenko et al., "Security and Dynamics in Customer Controlled Virtual Workspace Organisation", Jun. 2007, ACM, pp. 231-232.*
Srivatsa et al., "Trust Management for Secure Information Flows", Oct. 2008, ACM, pp. 175-187.*
Boyd, Danah. "Faceted Id/entity: Managing representation in a digital world." Program in Media Arts and Sciences, MIT, 2002. <http://www.danah.org/papers/Thesis.FacetedIdentity.pdf>.
Boyd et al. "SecureID: Security of Identity Through Knowledge." Aug. 25, 2009. <http://smg.media.mit.edu/projects/SecureId/>.
Ellison et al. "Protecting Secret Keys with Personal Entropy." Future Generation Computer Systems, v. 16, pp. 311-318. Oct. 28, 1999. <http://www.schneier.com/paper-personal-entropy.pdf>.
Frykholm et al. "Error-Tolerant Password Recovery." CCS '01, ACM, Philadelphia, Pennsylvania, Nov. 5-8, 2001. <http://www.rsa.com/rsalabs/staff/bios/ajuels/publications/fuzzpass/fuzzpass.pdf.
Just, Mike. "Designing and Evaluation Challenge-Question Systems." IEEE Computer Society, 2004. <http://www.cs.washington.edu/homes/toomim/challenge-question-design.pdf>.

(Continued)

*Primary Examiner* — Matthew Smithers
(74) *Attorney, Agent, or Firm* — Kilpatrick Townsend and Stockton LLP

(57) ABSTRACT

Access to resource(s) intended to be shared with specific groups of individuals is controlled using concise tests of shared knowledge instead of (or in addition) to accounts and access control lists. Users can readily learn the concept and choose questions that will control the access by the desired group with little effort. Such questions can be relatively secure to guesses by those not intended to have access, particularly if the number of allowed guesses is relatively limited. Users can generally predict the security of their questions, but sometimes underestimate the ability of attackers to use Web searching or enumeration to discover answers. In such cases, the system can automatically discover weak questions and then suggest alternatives. By lowering the threshold to access control, shared knowledge tests can enable more types of information to acquire collaborative value on the Internet and on other types of networks.

41 Claims, 8 Drawing Sheets

OTHER PUBLICATIONS

O'Gorman et al. "Call Center Customer Verification by Query-Directed Passwords." Research Session of Financial Cryptography, 2004.

Pering et al. "Photographic Authentication through Untrusted Terminals." Pervasive Computing, IEEE CS and the IEEE Communications Society, 2003.

Smugmug. "Galleries: Privacy & Security." 2 pp. 2009. <http://www.smugmug.com/help/private-albums>.

Yardi et al. "Photo-Based Authentication Using Social Networks." WOSN '08, Seattle, Washington, Aug. 18, 2008.

Zviran et al. "User Authentication by Cognitive Passwords: An Empirical Assessment." IEEE, 1990.

* cited by examiner

ACCESS CONTROL BY TESTING FOR SHARED KNOWLEDGE

RELATED APPLICATIONS

This application is based on a prior copending provisional application, Ser. No. 61/053,777, filed on May 16, 2008 and on a prior copending provisional application, Ser. No. 61/148, 329, filed on Jan. 29, 2009, the benefit of the filing dates of which is hereby claimed under 35 U.S.C. §119(e).

GOVERNMENT RIGHTS

This invention was made with government support under grant PARVAC 22177 awarded by the Department of Homeland Security. The government has certain rights in the invention.

BACKGROUND

People are increasingly sharing their lives online in photos, videos, blogs, GPS location logs, activity status and logs, exercise logs, office documents, notes, recommendations, reviews, bookmarks, software, purchase histories, and other personal artifacts. But it is often important that a boss, family member, or stranger not see specific personal information. Consequently, sharers must specify a set of rules that allows access to the information by some people, and denies access to others.

Although contemporary access control, based on explicit blacklists and whitelists (also called "access control lists"), is mathematically precise, it can also be too tedious, inflexible, complicated, or rude in many scenarios. For example, how can a mother share photos of her children with 80 extended family members and family friends, but not with potential Internet predators, without enumerating all 80 viewers, finding their email addresses, getting them accounts and passwords, and whitelisting them? How can an artist give the local art community access to a personal blog, without requiring a login and password, which could severely limit readership? How can a man prevent an ex-girlfriend from seeing his new girlfriend's Facebook photos, visible to all "friends," without alienating his ex-girlfriend? How can a college student conceal Facebook party photos from employers without blocking them by including their names on a potentially offensive blacklist?

Many personal authentication systems require answers to tests of personal knowledge, but these authenticate individuals rather than controlling access by groups. One such system is discussed by M. Zviran et al., who studied personal authentication questions like "mother's maiden name," now commonly used for password verification by banks, as described in their work, "*User Authentication by Cognitive Passwords: An Empirical Assessment*," Jerusalem Conference on Information Technology, 137144 (1990). These systems typically require a person to answer a generic question, store the response, and subsequently determine if someone attempting to gain access knows the response that was previously stored.

Shared passwords and keys are an alternative to allowing access without the account creation required for access control lists. However, these passwords or keys must still be distributed to a whitelist of users, which can be a rather onerous burden for the person sharing access to implement and maintain. Furthermore, users must remember or store and manage these foreign passwords (one for each whitelist of which they are a member). Instead, it would be preferable to determine access to data based upon shared knowledge by the person enabling access and a different person accessing the data. Finally, it would also be desirable to provide different people access to a site or to data at any time, without any need for redistributing passwords.

Based on the preceding discussion, it will be apparent that a more expedient and simple approach is desirable for controlling access by selected people or groups of people to resources that are being shared. The approach that is used should dynamically enable desired individuals or groups of individuals to access a sharer's resources, based on criteria that the sharer specifies, but without the need for the sharer to explicitly specify each person intended to view the resource and without requiring distribution of explicit passwords to the persons intended to have access.

SUMMARY

This application specifically incorporates herein by reference, the disclosures and drawings of each patent application identified above as a related application.

As discussed above, controlling the privacy of online content or other types of resources is difficult and often confusing, particularly if using shared passwords or other conventional approaches. Accordingly, a social access control scheme has been developed in connection with the present concept, where sharing users devise simple questions that can be answered with shared knowledge instead of constructing authenticated accounts and explicit access control rules or explicit passwords that must be distributed to those intended to access the data. Viewers must correctly answer a question to gain access to a resource. The shared knowledge question is chosen by a user so as to ensure a very high probability that only those people intended to access the resource will know the answer to the question. Unlike explicit passwords, shared knowledge is not distributed by the sharing user; instead, the shared knowledge is already known by the person(s) intended to access the resource. As used herein, the term "resource" is intended to broadly encompass almost any type of data or right for which access is to be controlled to enable one or more specific persons or groups of persons to have access, while denying access to all others. Thus, the term "resource" is often used interchangeably herein with the term "shared content," but can also refer to rights that are related to data, such as the right to write, delete, change, or add data to a protected store, and can refer to rights apart from shared data, such as the right to be included as one of a user's set of "top friends."

A prototype of a shared knowledge access control system and related studies have been implemented to explore the context of photo sharing security, gauge the difficulty of creating shared knowledge questions, measure their resilience to adversarial attack, and evaluate users' ability to understand and predict this resilience. As a result of these studies, a novel exemplary approach has been created for using a computing device to control access to a resource. One embodiment of this approach includes the steps of enabling a user who wants to provide access to the resource to specify a shared knowledge question and indicate one or more acceptable answers to the shared knowledge question. The user specifies the shared knowledge question so that only specific groups of one or more persons, who can, for example, potentially access the resource over a network coupled to the computing device, are likely to know an acceptable answer to the shared knowledge question, based on the expectation that the specific group of one or more persons should have the knowledge or information necessary to successfully answer the shared knowledge question. A person desiring to access the resource is presented with the shared knowledge question. In response, the person can enter a proposed answer (i.e., a "guess") to the shared knowledge question. In one exemplary embodiment, using the computing device, an inexact matching procedure is automatically employed to determine if the proposed answer at least inexactly matches any of the one or more acceptable answers sufficiently to enable the person to access the resource. If so, the person is enabled access to the resource. Otherwise, the person is denied access to the resource.

The inexact matching procedure can include one or more of the steps of automatically ignoring word variations between any of the one or more acceptable answers and the proposed answer as defined by linguistic dimensions, ignoring at least one extra word if included in the proposed answer but not included in any of the one or more acceptable answers, and ignoring an order of plural words appearing in the proposed answer, so long as each word included in any of the one or more acceptable answers has a corresponding word in the proposed answer. Further, the computing device can determine if any of one or more words in a proposed answer is a synonym of a word in any of the one or more acceptable answers. The step of automatically ignoring at least one extra word included in the proposed answer may be carried out only if the proposed answer also includes each word comprising any one of the one or more acceptable answers.

Another step can use the computing device for determining an indication of an identity of the person without requiring the person to input a name or other identification when attempting to access the resource by answering the shared knowledge question at or before that time. In connection with this step, the computing device can automatically determine that the person has attempted to access the resource from an online account that is confirmed by the user as being authorized to guess the shared knowledge response (wherein the online account is associated with the indication of the identity of the person), or can automatically access a web browser cookie that is stored on a computing device being used by the person, the web browser cookie indicating the identity of the person. As a further alternative, the computing device can automatically determine an Internet protocol (IP) address of the person who is attempting to access the resource, the IP address being associated with the indication of the identity of the person.

It can be important to determine an identity of each person who attempts to access the resource to enable maintaining an access log. This log can include a record for each time that any person attempts to access the resource, and the record can provide an indication of the identity of the person making the attempt.

The novel approach can also automatically impose limits related to the number of incorrect proposed answers input by persons to one or more shared knowledge questions; and, based upon the number of incorrect proposed answers that exceed a predetermined limit, can take a predefined action that affects further input of proposed answers. For example, the novel approach can include at least one of the following steps. If a total number, $I_g$, of incorrect proposed answers made by any person with an indicated identity g, for all shared knowledge questions for which the person input a proposed answer exceeds a first predetermined limit $X_g$, the computing device can disallow any more attempts by the person with the indicated identity g, to input a proposed answer for any shared knowledge question. Further, if a number, $I_{gq}$, of incorrect proposed answers made by the person with the indicated identity g, for a specific shared knowledge question q exceeds a second predetermined limit $X_{gq}$, the computing device can disallow any further attempts by the person g to input a proposed answer for the specific shared knowledge question q by the person. And, if a number $I_q$ of incorrect proposed answers made by any person for the specific shared knowledge question q exceeds a third predetermined limit $X_q$, any further attempts by any person to input a proposed answer to the specific shared knowledge question q can be disallowed.

Data in the access log can indicate the shared knowledge question presented, an indication of the user who specified the shared knowledge question, and an indication of the identity of each person who input an acceptable answer to the shared knowledge question. Using such data, the computing device can determine a number of successful attempts by one or more persons to access one or more of the user's resources by answering shared knowledge questions specified by the user, by input of acceptable proposed answers, and can then determine a degree of relation function between the user and each person, based at least in part on the number of successful attempts by the person to input an acceptable proposed answer to the shared knowledge questions of the user. The degree of relation between the user and a person can also be based in part on a number of successful attempts by the user to input an acceptable proposed answer to each of one or more shared knowledge questions that have been specified by the person to control access to one or more resources of the person.

The degree of relation between the user and persons can be used by the computing device to automatically carry out at least one of the following steps. The computing device can: (a) determine whether to display information about one or more persons to the user based upon the degree of relation of each person to the user; (b) can determine whether an indication (e.g., such as a color indicia on emails) will be activated and presented to the user in regard to information received from one or more persons, based upon the degree of relation of each person to the user; (c) can determine a sort order for presenting items received from a plurality of persons based upon the degree of relation of each person to the user; (d) can determine the degree of relation with a different statistic to produce a parameter used to determine an action that is taken in regard to information presented to the user; (e) can identify persons who are more trusted than others by the user, based upon the degree of relation of each person to the user; and, (f) can define social hubs that include the user and the plurality of persons, based upon the degree of relation between the user and the plurality of persons. The computing device can also optionally apply a weighting function to each shared knowledge question for use in determining the degree of relation.

Once it has been specified to control access to a resource at one site, the same shared knowledge question can be used to control access to a plurality of different resources at different sites accessible over a network. Thus, a shared knowledge question that is part of a set of shared knowledge questions to which a person has previously input a proposed answer determined to be acceptable, can be used when the person subsequently attempts to access the different resource, and may also be used in combination with at least one other shared knowledge question. In this case, the shared knowledge question that is reused and at least the one other shared knowledge question must all be successfully answered correctly for the person to be allowed to access a resource at a different site. Furthermore, the one or more shared knowledge questions that are reused might be used to control access to a second resource only if the party attempting to access the second resource has first failed to provide a predefined password initially required to access the second resource, or because there is a concern about granting the party access to the second resource using on a different initial procedure other than the shared knowledge question to control the access. The at least one concern might arise because the second resource has a substantially higher value than other resources for which access is granted based only on use of the different procedure, or it may arise because of a possible fraud by the party in attempting to access the second resource has been detected. The concern might arise if suspect behavior (e.g., by a bot) has been detected in connection with an attempt to access the second resource.

If a site includes a plurality of resources for which the user has chosen a plurality of shared knowledge questions for use by the computing device in determining specific groups of persons who are granted access to the resources, the user can associate subsets of the shared knowledge questions respectively with subsets of the specific resources, but without indicating to the person attempting to answer the shared knowledge question the existence of the resource of the user to which the person will be granted access if the proposed answer input to any of the shared knowledge questions is acceptable. This approach effectively hides the resource to which the person will be granted access, until the proposed answer input by the person is determined by the computing device to be acceptable.

The computing device can also automatically evaluate the shared knowledge question specified by the user to determine a likelihood that a person might be able to guess a proposed answer that is acceptable, without actually having knowledge that the proposed answer is an acceptable answer. A value that is indicative of this likelihood can then be presented to the user who is creating the shared knowledge question, to provide a warning if it appears that the user has chosen a shared knowledge question that is easy to guess. The step of automatically evaluating can include at least one step such as determining if the acceptable answer to the shared knowledge question is a member of a set having only readily enumerable members (e.g., the names of the days of the week), or determining if the acceptable answer is readily discoverable by searching publicly available data, or by determining if the shared knowledge question is included in a predefined database of easily answered shared knowledge questions (for example, the answer might be readily discovered by searching on the Internet).

To assist a user in specifying a shared knowledge question, the computing device can suggest a category of shared knowledge questions or a shared knowledge question based upon data that have been compiled about the user or about persons who are friends of the user, or by identifying interests of the user, or by targeting content that has been uploaded or downloaded by the user over a network, or by making a suggestion derived from a database of predefined shared knowledge questions that correspond to interests and activities of the user.

The computing device can further be employed to enable the user to choose a plurality of shared knowledge questions for controlling access to one or more resources and to specify a plurality of specific shared knowledge questions that must all be answered correctly by a person to gain access to one or more resources, or a Boolean combination of shared knowledge questions that must be answered correctly by a person to gain access to one or more resources, or a portion that is less than all of a plurality of shared knowledge questions that must be answered correctly by a person to gain access to one or more resources.

Other aspects of this novel approach are directed to one or more exemplary systems for controlling access to one or more resources. Such systems include a memory in which are stored data related to the resource or enabling the resource to be accessed, and machine executable instructions. An interface is included for enabling bidirectional communication with computing devices used by parties at disparate locations. The memory and interface are coupled in communication with a processor that executes the machine executable instructions and implements functions that are generally consistent with the steps of the approach described above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 9:
Figure 10:
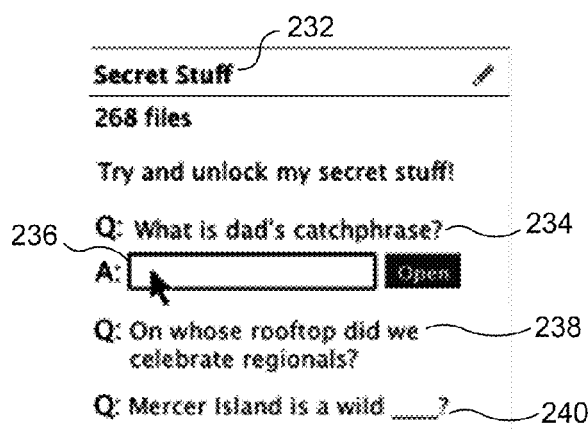
Figure 11:
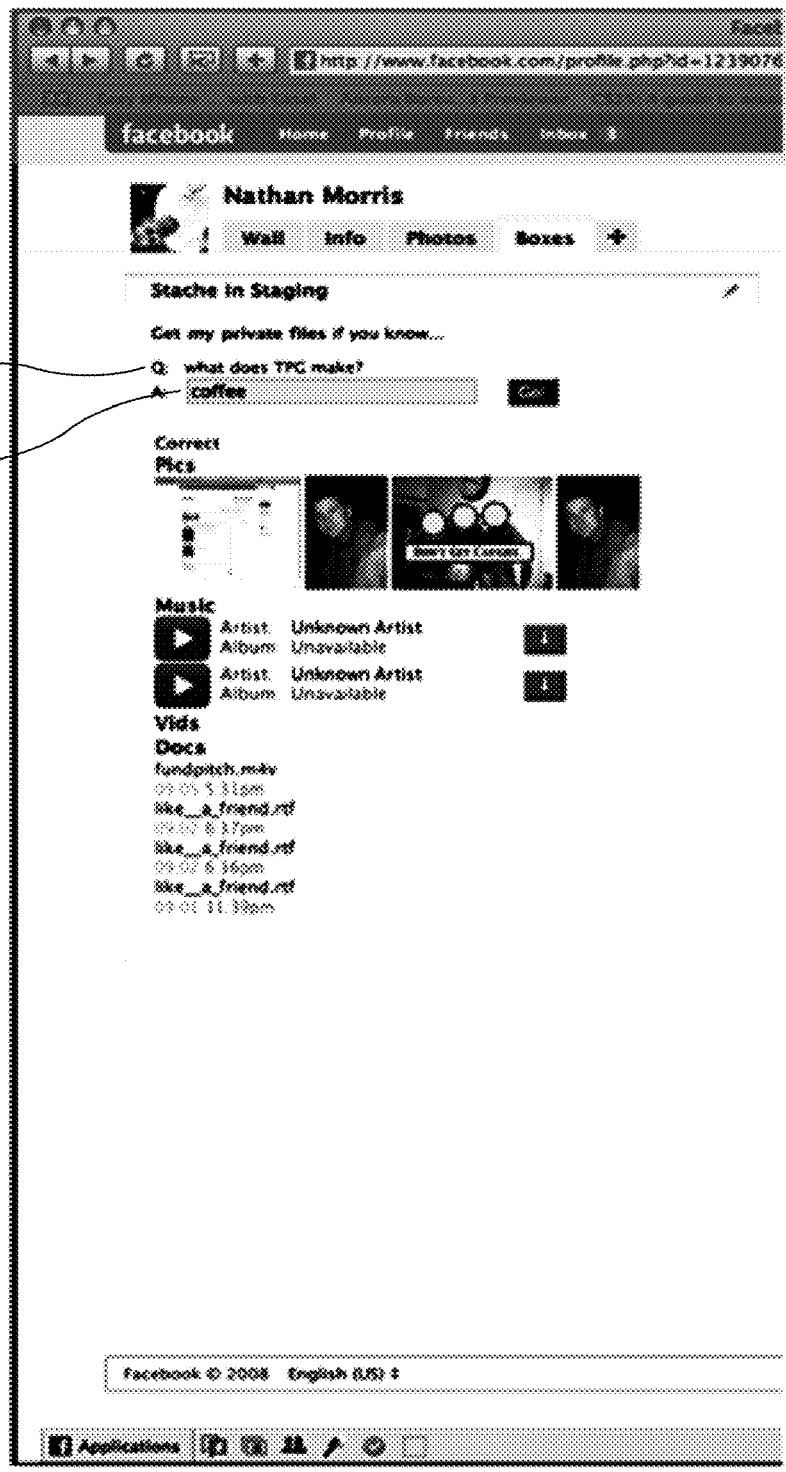
Figure 12:
Figure 13:
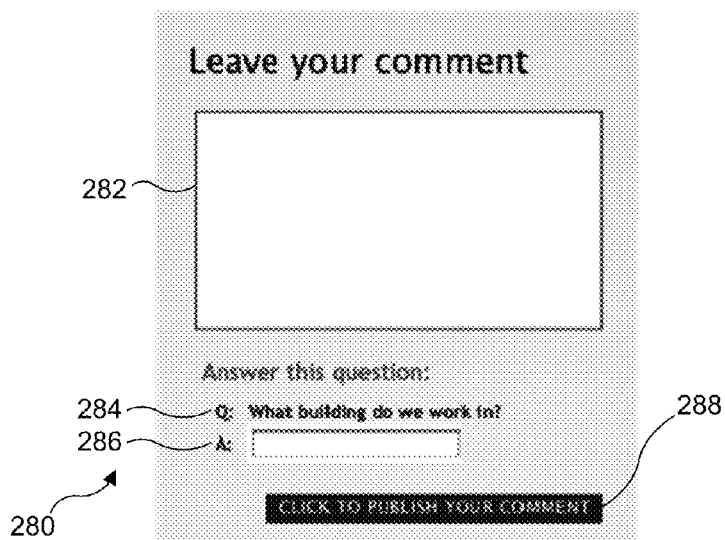
Figure 14:
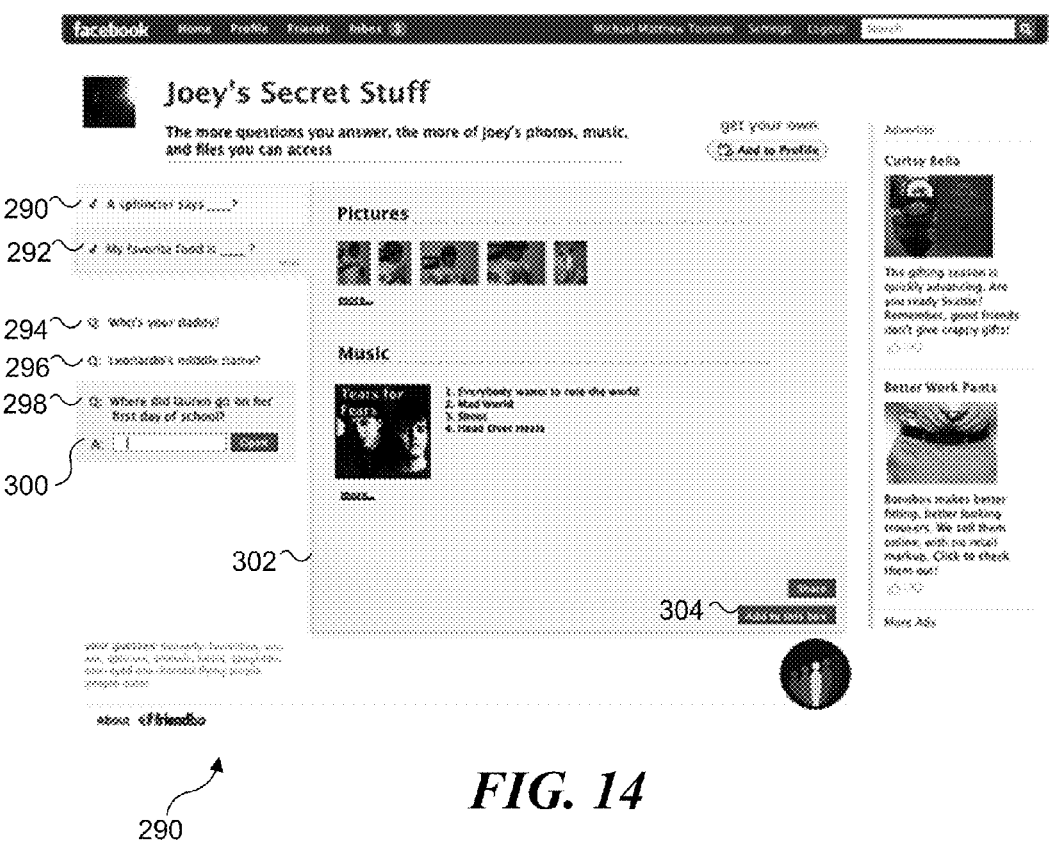

FIG. 9 an exemplary screenshot of a shared knowledge access control user interface for access and answering questions, wherein an answer input box appears after the user clicks on a question;

FIG. 10 shows a zoomed in view of FIG. 9, focusing on the answer input box;

FIG. 11 is an exemplary screenshot of a shared knowledge access control user interface showing that content (e.g., photos, videos, music, text, and other types of data), which is protected behind a shared knowledge question, only appears on the same page as the shared knowledge question after a user has successfully answered the shared knowledge question;

FIG. 12 is a screenshot of an interface for creating multiple questions, multiple answers (e.g., by clicking the "+"), uploading content, viewing content, and viewing access logs decomposed into recent guesses, as well as viewing a dissociated list of people who successfully accessed the content;

FIG. 13 depicts using shared knowledge to guard write access to a blog, wherein a person cannot post to the blog without first correctly answering a question; and FIG. 14 shows an exemplary dedicated screen that allows guessing questions and viewing content, which is an alternative to displaying the content inline in the normal page (as shown in FIG. 9).

DESCRIPTION

Figures and Disclosed Embodiments are not Limiting

Figure 1:
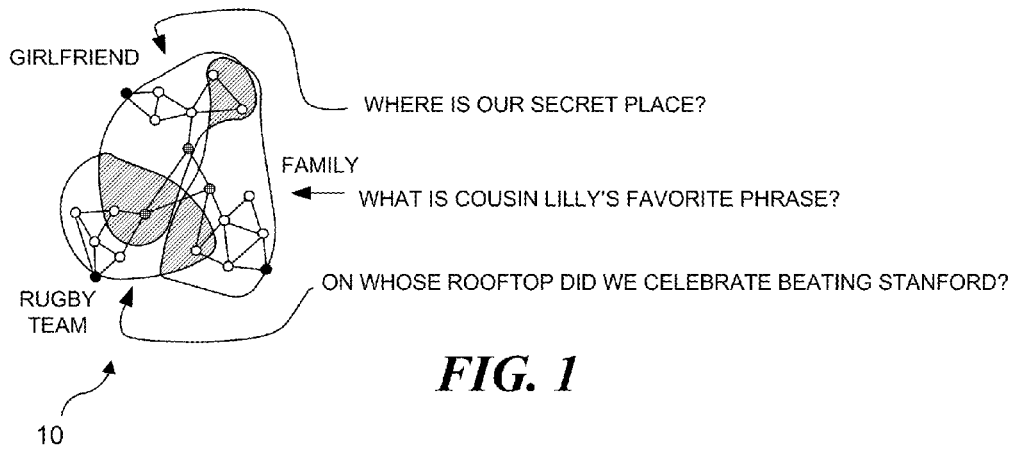
FIG. 1 is a schematic diagram illustrating how a concise question of shared knowledge can define a region of friends in a social network without explicitly defining the network or its cliques.

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.
Example of Present Approach It has been observed that social cliques overlap with regions of shared knowledge, as indicated in an exemplary schematic diagram 10 that is shown in FIG. 1. In diagram 10, there are three overlapping social cliques corresponding to those who know and/or associate with a sharer's girlfriend, a Rugby team of which the sharer is a member, and the sharer's family. Three different shared knowledge questions can be employed when the person wants to share different resources, so that each resource (e.g., photos, or other information) is shared only with members of a specific one of these cliques, but not with anyone else. For example, only members of the girlfriend clique are likely to know the answer to a shared knowledge question such as, "where is our secret place?"— even though that clique also includes members of both the Rugby team clique and of the family clique. Similarly, only members of the Rugby team clique are likely to know the answer to the shared knowledge question, "on whose rooftop did we celebrate beating Stanford?" And, only those in the family clique are likely to know the answer to the shared knowledge questions, "what is cousin Lily's favorite phrase?" The present approach is thus based on the concept that sharers can design tests for shared knowledge where a viewer must prove he or she knows some shared information in order to access the sharer's resource. One such class of tests is described as textual guard questions of shared knowledge, such as the above-noted exemplary shared knowledge question, "what is cousin Lily's favorite phrase?" Such shared knowledge questions must be answered with a correct textual response to view a photo album, or to access other types of private data or resources of the sharer.

Another type of shared knowledge test, which does not represent a best use mode of the present approach, is group resource recognition, where an informational artifact such as a photo, video, or text snippet that may or may not be derived from a group knowledge base (such as a company photo album) is presented to a potential viewer, and the viewer must correctly specify whether the artifact is part of the group's collective knowledge base. The viewer will be provided access if and only if he or she specifies this information correctly.

More generally, such shared knowledge access control tests can be derived by taking any personal knowledge test (traditionally used for authentication as described above) and replacing the use of personal knowledge with shared knowledge. For instance, textual shared knowledge questions are a shared knowledge version of personal knowledge questions referenced above in the Background section, and group photo recognition is a shared photo-knowledge version of the personal photo-knowledge authentication method described by T. Pering et al., in "*Photographic Authentication through Untrusted Terminals,*" IEEE Pervasive Computing, 2(1), 3036 (2003).

The data or resource protected by shared knowledge tests may reside on a computer reached through a network or on the same computer through which the viewer tries to access the data or resource, which may be the case, for example, if the sharer and viewer use different accounts on the computer.

Design issues and a study investigating the design and security of shared knowledge questions, as a specific example of shared knowledge tests, are described below. This work is guided by the observation that social security may not need to be "hard" in the strict, cryptographic sense, but may instead prioritize usability, flexibility, ambiguity, and social nuance, thus being useful in a new array of situations.

Whitelists and blacklists require users to explicitly translate social relationships into lists of account names or email addresses. This requirement is problematic for several reasons, as indicated below in the discussion of specific approaches that should be avoided.
Tedious Approaches Authenticating accounts and creating and maintaining lists for many photos or albums, each with many accessors, requires substantial work and makes it easy to forget people. The process of authenticating accounts to control access to data is thus too tedious and is generally not a desirable approach.
Approaches that are Rude and Lacking in Social Nuance Social relations are inherently soft and ambiguous, yet white/blacklists are hard and binary. The mere act of categorizing individuals into groups is known to produce prejudice and discrimination. It can be insulting for a person to learn that the person is on a friend's blacklist; it is less offensive to be unable to answer a question about the friend's summer travels. As a medium, the Internet already polarizes social relationships, and it is preferable to pursue policies that allow more social nuance.
Inexpressive or Complicated Approaches To alleviate the tedium of large lists, websites can let users whitelist predefined groups of users, such as "friends and family," or blacklist other users or groups of users. However, predefined categories do not allow for personalized groups, such as "close friends," or special exclusions.

On the other hand, more expressive grouping mechanisms, such as UNIX groups, become complicated to use in ways similar to programming, i.e., they require education, abstract reasoning, advance planning, and debugging.

Thus, whitelists and blacklists exist in a bounded sea of zero-sum tradeoffs. Without groups, such lists are tedious; with arbitrary groups, they are complicated; and, with predefined groups, they are inexpressive. Shared knowledge should be more flexible.
User Interface to Elicit Questions and Answers To guide users in how to use shared knowledge access control, an exemplary implementation can prompt the sharer to specify questions and answers explicitly, as in FIGS. 6 and 12, for example, by providing text fields in which the sharer can type a question and answer(s) and by labeling them so as to communicate the idea of a question and answer, such as with labels "Q:" and "A:" or more specifically, "question" and "answer." Other user interfaces can alternatively be used for eliciting question and answer pairs. Further, the question can be automatically determined by a computing device, or the user can select one from a list, or one can be created by incorporating data about the user from elsewhere in the system.

Coping with Guessers and Forgetters

Figure 6:
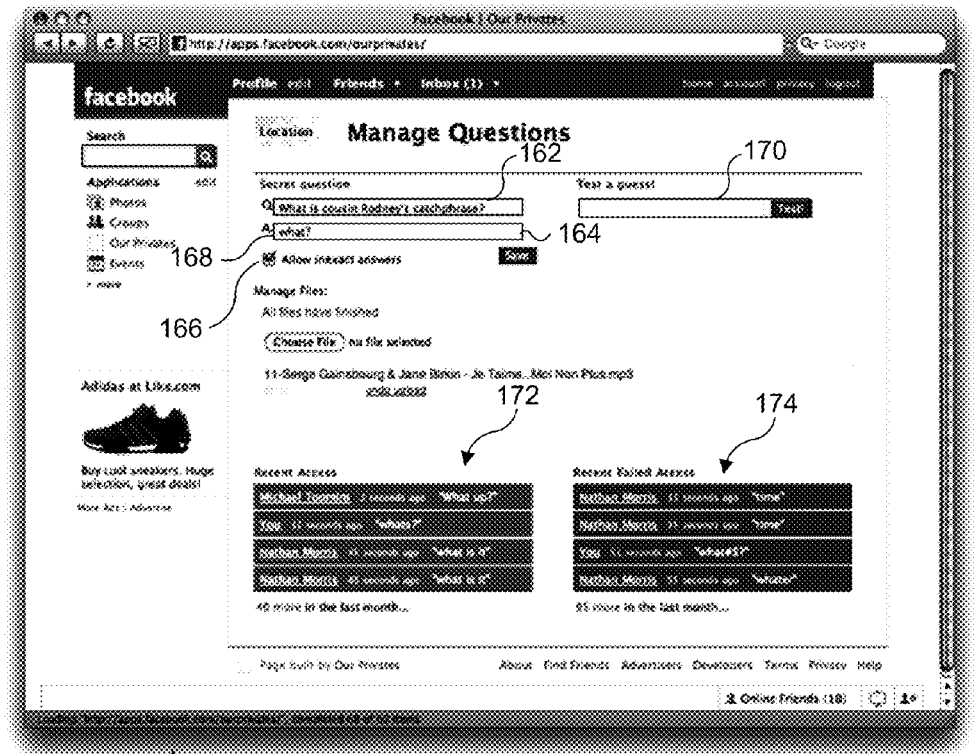
FIG. 6 is an exemplary screen shot of a shared knowledge access control application developed for use on the Facebook platform, illustrating tools developed to manage shared knowledge questions.

However, shared knowledge systems must cope with motivated or clever users guessing answers to questions they do not know, and others forgetting answers they should know. The present novel approach contemplates the use of social pressures and technical barricades, directed towards three classes of guessers:

- Socially disconnected strangers and voyeurs that know little of the sharer or the sharer's friends have little information with which to guess a correct answer, so it is important to limit the number of guesses that can be made. This approach is referred to herein as "guess limits."
- Guessers with some connections in the sharer's social graph have some resources to make better guesses, but face the counter-incentive of social disgrace if caught inappropriately guessing answers, which can be leveraged, by logging and displaying access attempts to the sharer, as shown in FIG. 6. This approach uses "access logs" to store data related to each attempted access of a shared resource.
- Friends who forget or misphrase an answer appear in the access logs with an interface to explicitly provide access, putting them on a whitelist. Alternatively, they might ask someone for the answer, since questions such as "where did our club eat" implicitly describe who should get access.

Guess Limits

When guess limits are applied, the system allows a user to make guesses up to a point, after which the user is no longer given the ability to guess, such as by disabling the guessing feature or automatically denying access for all subsequent guesses. The system or sharer can choose the point at which to no longer allow guesses in a variety of ways. The following two paragraphs describe an approach to choosing the point (but should not be interpreted as limiting the ways in which the point may be chosen, since it will be understood that other approaches can be used instead).

This approach records the guesses, the guessers, the time of each guess, and the text of the question being guessed at the time, and then imposes limits in at least one (or all) of the following three ways. (1) If the total of incorrect guesses any guesser g has made $I_g$ (summing across all questions) exceeds a number $X_g$, disallow any more guesses from guesser g on any questions. (2) If the number $I_{gq}$ of incorrect guesses a guesser g has made on a particular question q exceeds a number $X_{gq}$, disallow any further guesses from g on q. (3) If the number $I_q$ of incorrect guesses made by any guesser on a question q exceeds a number $X_q$, disallow any further guesses from any guesser on q.

Although these limits do not make it impossible for guessers to guess answers, they make it unlikely for strangers to correctly guess a large number of answers by, in turn, (1) guessing many questions; (2) taking many guesses for a particular question; or, (3) collaborating with other guessers to take many net guesses for a particular question. One mode of use that is contemplated is to choose numerical values for these limits, for example, $X_{qg}=2$, $X_q=10$, and $X_g=10$, which are likely to minimize the risk of guessers being successful in simply guessing an acceptable answer to the shared knowledge questions.

Finally, a system of guess limits can include a mechanism for re-enabling further guesses, such as giving the sharer an interface for viewing the incorrect guesses, guessers, times, and/or questions guessed and re-enabling guesses (clearing all guess counts to zero) or specifically setting new values for $I_{qg}$, $I_q$, and $I_g$; or automatically enabling new guesses (e.g., by reducing $I_{qg}$, $I_q$, and $I_g$) after an amount of time has passed (e.g., reducing each count by 1 after a day).

Access Logs

Access logging records all or some of the guesses, guessers, times of guesses, questions guessed, texts of questions at the time of guessing, and/or a Boolean value indicating whether or not access was granted by each guess. Then these data are displayed to the sharer, friends, system administrators, or other set of people (FIG. 6) in order to make the socially unacceptable behavior of guessing known. A best use envisioned is to display them to the sharer, who may then relay the knowledge of the guesser's behavior to friends or other social relations. The logs may be shown to the sharer or a broader set of users, such as all friends, or all users. The logs may display only incorrect guesses, correct guesses, all guesses, or some other subset of guesses. The display of the logs may intentionally omit some information, such as displaying only approximate times like "yesterday," or no times at all, or only showing an abstract representation of the guesser, such as a photograph of him or her, which may have the benefit of providing more privacy and less shame to the guessers if doing so is valuable to the sharer or the specific application of this novel approach. One exemplary envisioned use of access logs is to display, for each question, the people who correctly answered a question, and separately display all the guesses for that question, but not display the relationship between the person and their guesses. This approach is evident in FIG. 12. Dissociating the guesses from the access increases the privacy of the guessers, but still dissuades inappropriate guesses. This method still provides a social disincentive to guessing a question a person should not know, since getting the answer correct adds the guesser to the list; yet, does not create the awkward situation of a person being caught guessing a question they do not know that they thought they did know, because their name will not be displayed next to incorrect guesses.

Logging and Displaying Guesses

In the access control system, a sharer can click on a failed guess to explicitly:

1. Allow the guess to be considered correct (e.g., by making the guess an alternative accepted answer).
2. Allow the guesser access. One method is to do the same thing as if the guesser had guessed the question correctly. An exemplary implementation may log the event as if the guesser had guessed correctly, or alternatively, log the event with a special "sharer explicitly gave guesser access" flag. The implementation that is used may analogously choose to display the event in the access logs in a special format or with a special distinction such as by saying "sharer explicitly gave guesser access." Another implementation strategy is to put the guesser on a whitelist.
3. Deny the guess being treated as acceptable. A variety of actions can be implemented for bad guesses. For instance, in connection with a guess that normally would be accepted by the guess-matching algorithm, if marked as "deny" by the sharer, can be used to train the algorithm to deny other types of guesses that are like that guess, or just that guess itself. An implementation can also put the guess on a special "brute-force guess" list that is consulted when checking guesses in the future, in order to take additional action at those times, such as sending an email, displaying the guess with special formatting, or otherwise notifying and/or calling attention to the guess event. An implementation might direct such a notification to the sharer(s), administrator(s), or other group of people to heighten their awareness of the brute force guessing attempt. This approach can be used to dissuade improper guesses.

4. Deny the guesser access (e.g., putting him/her on a blacklist). Exemplary implementations may also choose to notify users of blacklisted users in a way similar to that discussed above for guesses, to enhance the shame of being blacklisted and dissuade improper guessers. Additionally, aspects of this feature may be embedded within the guess denying feature. In other words, when a user of an exemplary implementation denies a guess access, the system may automatically deny the guesser access, put the guesser on a blacklist, and/or notify people in the sharer's social set of that action to enhance the shame.

An exemplary implementation can provide this ability by displaying a menu when a user clicks on a guess, with one or more of these four options in it. Alternatively, other user interface mechanisms can be used to do so instead.

Identification

Although authenticated accounts are not required in an exemplary embodiment of this novel approach, an embodiment that uses guess limits and access logging does need to know the guesser's identity to be effective. Depending on the incentives of users and attackers, a system might require guessers to provide, and perform identification with, friend-confirmed accounts, any account, web browser cookie, or Internet protocol (IP) addresses, providing varying levels of resilience to savvy, motivated users that create fake accounts. A friend-confirmed account is a website account that the sharer has confirmed to the system as being allowed to guess the sharer's questions. It is called friend-confirmed because social network websites commonly allow users to confirm the accounts of other users as "friends." Neither an IP address nor a cookie require additional effort from the guesser. The IP address can be determined from the network connection, and any web browser cookie that the website has access to in the guesser's web browser can be used for identification (one possibility is to create one specifically for the purpose of identification). The system designer's choice of identification depends on the embodiment's need for security. For instance, an unimportant weblog might need no more than IP address protection. As a failsafe, such a system can enforce a per-question global guess limit, blocking access until the sharer checks or changes the question. IP addresses can also be used to infer geographic locations for access logs using an IP address location lookup system, from which identity might be guessable, e.g., for an inquisitive ex-friend, who now lives in a different geographic location.

Exemplary implementations can choose amongst these alternatives to fit the circumstances or application requirements, striking a balance in the incentive structure between security and the overhead of guard questions.

Integrating with Traditional Access Control Lists

Exemplary implementations can also integrate shared knowledge tests with traditional access control lists. When a sharer puts friends who forget answers on a whitelist, as described above, this whitelist is consulted before requiring the viewer to answer the question. Additionally, an implementation can either put any viewer that correctly answers a question onto a whitelist automatically so that the viewer need not answer the question later, or not whitelist the viewer after correct answers, so that the viewer needs to re-enter the answer and prove his or her access right. An exemplary implementation can display the whitelisted users in access logs, along with users who have gotten access by guessing the question correctly, or it can take alternative approaches to logging, such as displaying the whitelisted users separately, or with a special visual format or distinction, or not displaying them near the logs at all.

Finally, sharers can explicitly blacklist users they do not want to have the chance to answer questions. The blacklist can either prevent them from answering the question, or seeing the question, or allow them to answer the question, but still hide the actual resource from them if they guess correctly. In the latter case, the act of hiding can be done by showing a fake or dummy resource to trick the viewer into thinking he or she was granted access, and was not actually blacklisted, even though he or she was. This approach makes it possible to blacklist viewers without them knowing they were blacklisted, which could reduce the negative social consequences of blacklisting.

Exemplary Application—Design of Questions for Photo Sharing

Since the summative effectiveness of shared knowledge security depends on its social context of use and implementation decisions, a formative study instead probes the underlying issues related to several questions. First, to whom do sharers want to show or from whom do they want to hide their photos, and does shared knowledge exist to divide these groups? Second, what types of questions do sharers devise, and how difficult are they to design? Finally, how vulnerable are the questions to guessing, and do sharers anticipate the vulnerability? To answer the first two questions, participants in this study were asked to devise questions for their own photos. To answer the third question, these questions were uploaded as challenges to Amazon Mechanical Turk™, and anonymous Internet workers were rewarded if they could guess the answers.

Designing Questions

First, 31 people were recruited and asked to identify a total of 179 photos that they wanted to share with some people, but not with others. These test subjects reported who they would want and not want to see each photo, as well as the importance of seeing or not seeing it on a four point ordinal scale, ranging from (1) "I barely care," to (4) "I care a whole lot." Finally, the subjects were asked to design guard questions that they felt would effectively control access to each photo, enabling it only for those people that the subjects desired to have access. For each question, they reported how long the design took and how many of 10 random strangers they thought could guess the answer within 10 guesses. The participants in this study were fairly diverse: 47% male and 53% female, and mean age 27 (standard deviation 8). These subjects were recruited through flyers on two websites and in three urban neighborhoods. They completed the survey online and received a small monetary payment in compensation.

Results: Desired and Undesired Recipients

Based on the input from the subjects, 315 responses indicating desired recipients, and 401 responses indicating undesired recipients were clustered into nine emergent categories, as shown below in Table 1.

TABLE 1

Desired and undesired people to see photos. Freq. is percentage of responses in a category. Imp. is mean rated importance of responses, on a 1-4 ordinal scale.

| Category of person or | Desired | | Undesired | |
| --- | --- | --- | --- | --- |
| group of people | Freq. | Imp. | Freq. | Imp. |
| Friends | 90% | 2.2 | 41% | 3.0 |
| Family | 76% | 2.4 | 79% | 3.0 |
| Strangers | 0% | — | 72% | 2.8 |
| Specific people by name | 46% | 2.8 | 24% | 2.4 |
| Common interest group | 38% | 1.7 | 41% | 3.0 |
| Authority figures | 21% | 3.2 | 42% | 3.0 |

TABLE 1-continued

Desired and undesired people to see photos. Freq. is percentage of responses in a category. Imp. is mean rated importance of responses, on a 1-4 ordinal scale.

| Category of person or group of people | Desired | | Undesired | |
|---|---|---|---|---|
| | Freq. | Imp. | Freq. | Imp. |
| Friends of photographed | 34% | 2.5 | 0% | — |
| Potential romances and employers | 10% | 3.5 | 7% | 3.6 |
| Ex-friends and romances | 0% | — | 14% | 2.7 |

Demonstrating a need for flexible access control policies, 83% of participants had photos to blacklist from friends or family—two categories that are commonly assumed to be groups on sharing websites. On average, the subjects in the study cared more about preventing access (2.6) than providing it (2.2) (<0.001).

Subjects easily understood the concept of guard questions (i.e., shared knowledge questions) and could readily create them after reading a one-paragraph description providing instructions. The subjects designed 168 unique shared knowledge questions (and 11 duplicates), which were clustered into six types, as shown below in Table 2. Subjects successfully designed questions for all but three of the 179 photos, a 98% success rate, suggesting that there exists shared knowledge to separate most inclusion/exclusion groups (though inclusion effectiveness was not evaluated). The median subject spent 8 seconds designing a guard question, according to the self reports. For comparison, it typically takes about 90 seconds to create a 10-person whitelist of email addresses using the Macintosh™ computer OS X™ operating system address book. However, guard questions in the tail of the distribution took much longer. The mean and standard deviation were 15 and 28 seconds, respectively. We also observed strong individual differences. One subject reported 155 seconds on average over her eight questions; her longest was 600 seconds, but the cause of this excessive time is not known. Vulnerability to a stranger guessing the correct answer did not seem to be affected by the design time by a subject for selecting a question.

TABLE 2

Types of questions generated and frequency

| Question Type | Example Question | Freq. |
|---|---|---|
| About themselves | What's my favorite spirit for mixed drinks? | 48% |
| Knowledge of a mutual friend | What was the name of Susan's hairy dog? | 13% |
| About a specific place or event | In what country did I work in Europe? | 12% |
| About the guesser | What river did we float down for Keith's B-Day? | 10% |
| Inside joke or reference | Spiky red hair on the dance floor drink | 8% |
| General Knowledge | The "AP" in AP Stats stands for? | 6% |

Cracking the Questions

To learn how vulnerable questions are to guessing, the questions were up-loaded as jobs on the Amazon Mechanical Turk™, a Web marketplace created by Amazon.Com that pays people to complete small tasks. Ten workers were recruited per question to take ten guesses each. They were motivated with a small bounty of $0.75 for a correct guess within three guesses, and $0.25 for a correct answer within the remaining seven of ten maximum guesses. For reference, many Amazon Mechanical Turk™ jobs pay pennies for a similar time commitment. All Amazon Mechanical Turk™ workers received $0.05 just for guessing the answer to an access question, even if incorrect. These incentives were designed to emulate those of unknown voyeurs (Category 1—"strangers" in Table 1), with no connection to the sharer or their social network of shared knowledge. The quality of Turk guesses was manually verified; a few poor responses were rejected, but the vast majority were of very high quality, showing clear evidence of clever thought and Web searching for answers.

Figure 2:
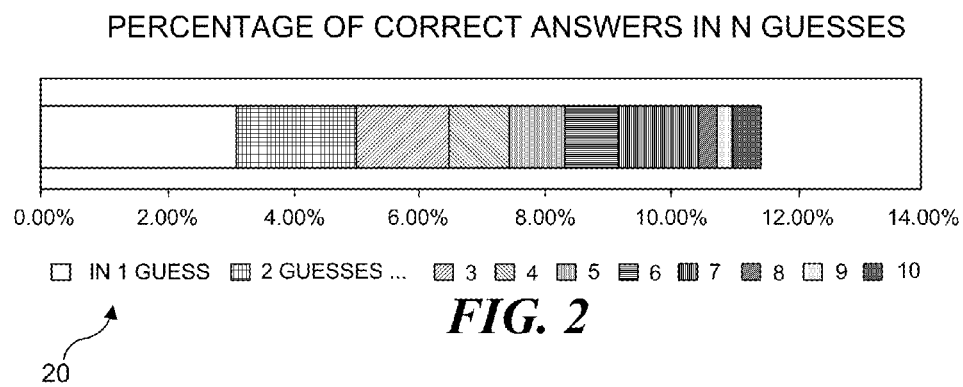
FIG. 2 is a bar graph illustrating the percentage of correct answers guessed by strangers as a function of the number of allowed attempts.

As can be seen in a graph 20, which is shown in FIG. 2, Amazon Mechanical Turk™ workers guessed correctly 6% of the time given three attempts, and 11% given 10 attempts. Thus, a guess limit of three could reduce the likelihood of correct guesses by a stranger by about a factor of two. It is unclear if guesses beyond seven make much difference, but the data suggests their added value may taper off.

However, some questions may be intentionally easy to guess, since users might just want to reduce, not necessarily eliminate, access to a photo, by those outside the desired class of people. In this case, users should at least be able to predict the ease of guessing their questions, since understanding the breadth of disclosure is critical for privacy-sensitive systems.

Figure 3:
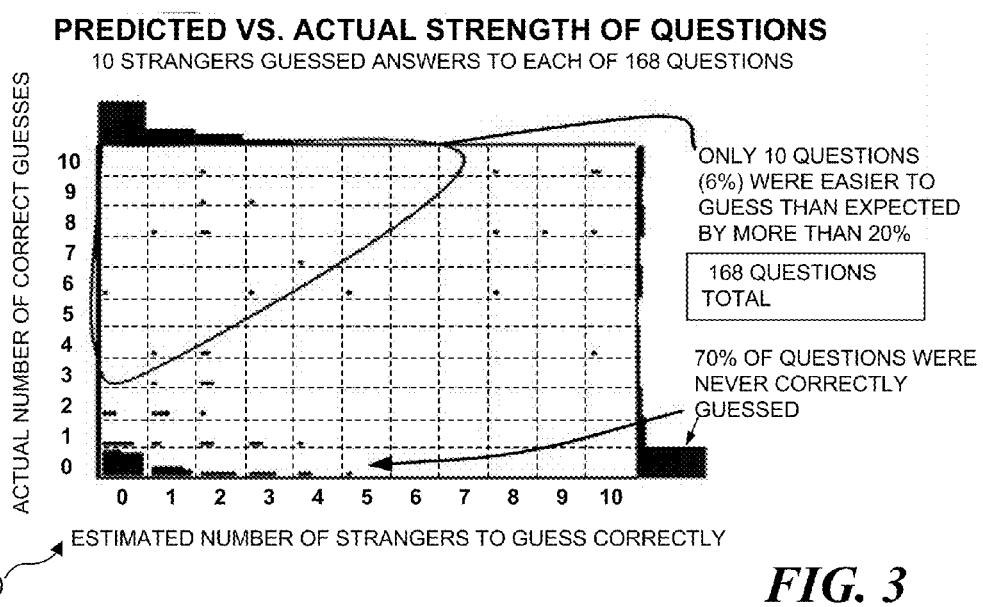
FIG. 3 is scatter plot showing the ability of sharers to predict the resilience of their questions to guessing.

It was found that the average subject had slightly better security (11%) than expected (14%). This finding is analyzed in more detail in a graph 30, which is shown in FIG. 3. The incorrect predictions are in the lower-right and upper-left. Of the 168 questions, only 10 (=6%) were less secure than expected by a margin of more than 20%. More common was a subject's prediction that strangers would make a few correct guesses for questions that could not be guessed by those attempting to do so. A linear regression gives $R^2=0.44$ between coordinates, assuming 10 guesses.

The seven cases shown in the upper-left with the most unexpected guesses were examined, and two common flaws were found. Five questions asked for an easily-enumerable class of answers, such as a small number, color, or day of the week (e.g., "What night of the week do I usually stay out late?"); and, two questions could be answered by searching Google for the question and browsing the first page of results (e.g., the answer to the question "Who lives in Chris's closet on the television show FG?" can readily be determined by making Web search). It is contemplated that the method can provide for using ontologies and Web searches to discover such weak questions automatically and if found, to suggest alternatives.

Even users that know the nominal correct answer may phrase it differently than the person who created the question. Accordingly, a set of rules were created to verify ambiguous responses, as implemented in a 37-line inexact matching algorithm that is summarized as follows.

Intra-word deviations: Spelling errors and stemming differences, such as "Teriers" for "Terrier" are allowed (i.e., treated as being the correct answer).

Alternative words: Abbreviations, acronyms, and synonyms are treated as incorrect responses.

Extra or missing words: Stop words, such as "and," "or," and "to," are ignored (i.e., do not cause the answer to be viewed as incorrect). If a guess has a few extra words, such as "Seattle downtown" instead of "Seattle," it is considered as over-specified and correct. If a guess has missing words, such as "grandparents" instead of "Gabe's grandparents," it is considered under-specified and incorrect.

An exemplary implementation can choose to allow only a certain number of extra words, to make it more difficult for guessers to introduce extra words on purpose, to increase the odds of finding a match.

An exemplary implementation of the algorithm is described below. It first cleans the guess and answer to ignore differences in case, punctuation and stemming, and then word-compares the resulting cleaned guess and answer.

Cleaning Step. for Both the Guess and the Answer:

1. Translate all characters to lowercase.
2. Translate separator punctuation characters (such as dashes, underscores and slashes) to spaces.
3. Remove all remaining punctuation characters except for whitespace (whitespace includes spaces, carriage returns, newlines and tabs).
4. Split the string of characters at whitespace to obtain a sequence of words, where each word contains a sequence of characters, rather than a single sequence of characters.
5. Use a stemming algorithm (for instance, the Porter stemmer) to remove stems from words and effectively translate them into a canonical form. Word-comparison step:
    1. If the number of words in the guess exceeds a threshold based on the number of words in the answer (for instance, a threshold equal to twice as many words as are in the answer), return "INCORRECT GUESS."
    2. Otherwise, for each word in the answer:
    a. Test each word in the guess. If the word in the guess has a Levenshtein (also commonly known as edit) distance from the word in the answer less than a threshold, and the word in the guess has not yet been matched to a word in the answer, label the word in the guess a "match" and continue to the next word in the answer. If no word matches, return "INCORRECT GUESS."
    b. Although any set of thresholds can be used, the present algorithm uses the following thresholds: 0 for answer words of length 1 and numbers; 1 for answer words of lengths 2-8; 2 for answer words of lengths 9-10; and 3 in all other situations.
    3. If each word in the answer has a match in the guess, return "CORRECT GUESS."

This algorithm was problematic in two cases: the university "case western" was judged correct for the university "western," even though "case western" is a specialization of "western." Similarly, when the correct answer was "2005 and 2007," the system incorrectly accepted a guess of "2003 2004 2005 2006 2007." As a solution, the question designer can specify whether a guess must be the answer or instead, may simply contain the answer. There are many potential avenues to reduce error rates, both through interaction and analysis, such as better visualizations of guesses and guessers; interfaces for sharers to specify alternative answers and ambiguity bounds; empirical investigations into weak question/answer types; providing a set of predefined questions to choose from rather than free-form text to avoid paradox of choice and weak question types; cognitive analysis of systematic guess rate underestimates; and natural language analyses for answer verification and weak shared knowledge question detection.

As noted above, this formative study did not attempt to evaluate the real-life access rates of social relations and friends (Categories 2 and 3), since so many real-life and implementation variables influence their behavior.

Shared knowledge questions (or "tests") can also be applied to domains of access-control for resources beyond photo sharing, such as blogs, café WiFi access, real-time location data streams, automatically moderating mailing list subscriptions, subgroup CAPTCHAs, and group project Wiki access control—all of which are further examples of "resources." Shared knowledge tests can also be combined with traditional access controls in interesting ways. For instance, one might use a shared knowledge question over a hidden blacklist to make it possible for the sharer to hide things from another person without them realizing that they are on a blacklist, because the question answering step makes the viewer uncertain for what reason they were denied access. In addition, shared knowledge questions can be used with traditional security mechanisms such as passwords and biometric input, to provide a further layer of access control. One can even use the questions as a form of personal authentication, alone or with other forms. For instance, an exemplary implementation can determine that a person is who they say they are by asking them shared knowledge questions that they have successfully answered in the past, or shared knowledge questions that they have created for other people to answer (and for which they should thus know the answer).

Using the Access Logs for New Purposes

Calculating a Function (Degree of Relation) between People

A function (referred to here as degree of relation) can be calculated between people based on how many of each other's shared knowledge questions they have answered and optionally, the categories of shared knowledge questions that they have answered. This function uses as an input the set of successful access events (each access event records a question, the person or people whose content is protected by the question, and the user who successfully answered the question), and provides an output value signifying the degree of relation between the users. This function can serve many purposes, as is described below.

An envisioned use of this system provides that each question receives a weight (such as weight=1 for each question, or weight=1/log(number of people who answered the question), or some other type of weighting function). Then, the degree of relation between two people can be computed as the sum of all weights of questions they have answered about each other, divided by the sum of all weights of all their questions.

Preferentially Displaying Information Using Degree of Relation

Many systems display a large stream or database of information that is related to people. For instance, email clients display many emails from many people, social networking websites display news feeds and search results about a person's friends, and visualization software suites display social networks of people in a corpus and help investigators understand their relationships and events and items that relate to those people. It is desirable for users of such systems to sort, rank, filter, format, and otherwise manipulate the presentation of such information to make the most relevant information easier to find.

A system can use the degree of relation function as input to the presentation manipulation function. For instance, a social networking site can preferentially display events about a user's friends that have a high degree of relation. An implementation using this function filters all events from the incoming event stream about friends whose degree of relation is not in the top set (such as 25) of events for that day or other block of time. An email program can employ an indicia to highlight messages in the inbox from friends with a high degree of relation, for instance by changing the color of the message if the sender's degree of relation with the user is above a threshold, or making the brightness of the color proportional to the degree of relation. A search result for emails or files can sort them to show items with high degree of relation first or last. The presentation can also use degree of relation in a more complicated way, such as adding degree of relation to other statistics such as a spam rating before thresholding, or incorporating the calculated degree of relation into any other algorithm.

In one implementation of this system, the concept of weighted questions that was outlined above is used. In this concept, a shared knowledge question that has only successfully been answered by one or two users, but has been unsuccessfully attempted by many users can be accorded a greater weight (i.e., be deemed more selective) than one answered by many users.

Another application of this type of ranking is filtering, sorting, or highlighting emails from people who have answered different levels of questions. Those users who have answered more difficult or more personal questions are placed on higher priority lists. This approach can help a user find information relevant to them and is useful for sorting hundreds of emails per day.

Access Control Determined by Degree of Relation

This ranking method access control to be managed by allowing people who have a degree of relation above a predefined threshold and denying access to others who do not meet the predefined threshold.

In one exemplary implementation, users who are below a predefined degree of relation threshold must answer the shared knowledge question to gain access. Alternatively, the system could be set up so that users who are below the threshold are automatically denied access without the opportunity to answer the question or are directed to dummy content. This access control system can apply to any set of content and to any access control system, such as shared knowledge, and can control access to profile entries, photos, music, or other data files.

Selecting a Set of Friends by Degree of Relation

The present system has a novel user interface for selecting a subset of a user's friends (selecting members of a whitelist from a set of friends) that meet a certain trust level (defined here and above, by exceeding the degree of relation metric for that friend). This system enables trusted friends or friends who are in a certain social circle to automatically access protected content. Other friends or non-friends are automatically denied access to the content or must answer shared knowledge questions to access the content. The benefit to the content owner here is less time spent sorting access control and more automation of the access control management process. The system allows the content owner to leverage previous activity on the shared knowledge access control system. The content owner is not required to generate as many shared knowledge questions and can more easily control access by having the shared knowledge access control system assess trust levels (which are previously defined by the degree of relation trust metric). The benefit to the content seeking user is a reduction in the number of questions they must answer to access content. Also, since with this system, the content seeking user may be allowed to access protected content if they have attained a certain trust level (degree of relation), false negatives or incidences of users being incorrectly blocked from content are reduced.

In this novel user interface, a user enters a threshold level, for instance, by dragging a slider or entering in a number, to choose how many of his/her friends should be allowed access (ranked by their closeness or degree of relation). If a slider is used, on one side of the slider, all of that person's friends are selected. On the other end, only the most selective or the closest friends are selected and will be allowed access to the protected content.

An alternative user interface setup is to let the user select from categories of friends that correspond to levels of trust. In an exemplary implementation, these categories are labeled "most trusted," "trusted," and "less trusted." The categories of friends may have any labels, but the labels should indicate in some way the level of trust another user should have to be able to access the site.

These labels may be simple check boxes that a user clicks on, radio boxes, or again a slider user interface that defines the degree of trust or degree of relation a user must have to be able to access a specific content of the sharer.

Users who do not have a degree of relation metric attributed to them may have to answer shared knowledge questions or, if the content owner so specifies, they can be blocked from all content and/or the shared knowledge questions can be hidden from them. These users do not have a degree of relation metric associated with them because they have not yet interacted with the content owner online or have not attempted to answer the content owner's shared knowledge questions.

Using Shared Knowledge Questions to Determine Social Hubs

The present novel system records the number of questions that a person has attempted to answer (correctly or incorrectly) and/or had answered about them (correctly or incorrectly) to determine who is a member of a social hub. Those users who have correctly answered a large number of questions about other users and who have had other users attempt to answer (correctly or incorrectly) a large number of questions about them are considered members of social hubs. Such "social hubs" may have a higher value to advertisers due to their influence on their social groups. The present novel system specifically utilizes these social hub metrics for the purpose of targeted or preferential advertising. The system uses these shared knowledge metrics to target advertising either to the specific social hub or to other users visiting that social hub's "content." "Content" may be any resource, such as a user's homepage, photos, social networking page, online music page, or any other type of online content.

Easy Mailing Lists and Other Lists Utilizing Shared Knowledge Questions

In addition to providing access control to a resource, shared knowledge systems can be employed in another way that aids the user in referencing sets of friends in everyday applications. The list of people who have been granted access to a photo album, for instance, might also be the friends that a user would want to invite to a party in the future. Thus, the system can provide a user interface mechanism for inviting each of the people on the list of friends to a party, sending them an email, putting them on a mailing list, or otherwise taking that list of friends and using it as a list of people that the user would otherwise have had to manually specify or specify using some other listing mechanism.

One way to implement this functionality is to define an object in the computer software that represents a "list" of people. Then, one of these list objects is created for the people who successfully answered a shared knowledge question. Finally, this list object is allowed to be referenced in a workflow for other tasks. For instance, an email program can allow an email to be sent to people in the list, or prioritize or color all emails from people in the list, and an event calendar can create invitations inviting people in the list to an event.

These lists can also be created for people that exceed predefined thresholds of degree of relation. The user can create a degree of relation filter using the interface described herein, and the system can then make a list of the people who have a degree of relation that exceeds a predefined threshold. The user can employ this list for an event invitation, email list, or other purpose. Such lists can also be created for Boolean combinations of questions and other lists, to express groups such as "everyone who has answered questions A and B and is not blacklisted on list C, and additionally, the friends in the top eight degree of relation positions, and a specific friend X." The Boolean operations can be specified with a standard interface for creating trees of Boolean operators.

A user interface for controlling these lists might provide a button called "use this list" that appears with the access log list of people who have answered a question. When the user clicks that button, a menu appears with items for a number of applications that a person might do with the list. For instance, a menu item called "send them email" and "invite to event" might be included in the menu. In addition, when the user is using any of these applications directly and listing people in them, such as typing the email addresses of the people to whom the email will be sent, the user can type in the shared knowledge question and an auto-complete menu item will appear after the user has entered enough characters to match the question (using existing auto-complete technology) that states "Friends who answered <question>." If the user selects this item by clicking on it or pressing return, it will be used in the program, as a list of people, just as described above.

The lists can have their own distinct user interface objects or widgets. In one implementation, each list can be displayed within a rounded-corner rectangle with a blue background color that says, in white text, "Friends who answered <question>." This object can be dragged and dropped by the user to copy it into new locations, such as dragging it from a shared knowledge access log into an address book, creating an "address book group," or dragging it from the "to:" field of an email, to the "cc:" field. The object can also be copied and pasted.

These objects can also be used to specify access control, e.g., for expressing concepts like "all users who answered question X can edit this document." Also, in one contemplated implementation, as additional people successfully answer the set of shared knowledge questions that the box represents, and others undo access, the object's representation can change to include the new people and drop the people who have undone access (in the places the object was used, e.g., the people newly granted access might now be able to see emails that were sent before they were granted access). In another possible implementation, the object can represent only the people who had access at the time the object was originally used.

Reusing Shared Knowledge Questions

Another problem that often arises in computer systems is personal authentication, i.e., authenticating a single person to a single computer account assigned to that person. For instance, many email websites authenticate users by having them log into the website with entry of a username and a secret password. However, it is often desired to have additional methods of authentication. For instance, an alternative authentication might be needed if the person forgets the secret password or if the system wants additional certainty that the person is who they claim to be.

To achieve this authentication capability, exemplary authentication systems can be integrated with a database of shared knowledge questions and then employed to authenticate users by asking them to answer shared knowledge questions. This feature can augment existing authentication techniques, providing additional identity security, and can, for instance, replace the password recovery questions currently used by banks when a user is accessing an account and by other websites.

To implement this feature, in an exemplary embodiment, the person controlling access to one or more resources chooses the shared knowledge questions to ask users, determines the number of questions to ask, and determines—given a set of questions answered successfully and unsuccessfully, whether the user has answered enough questions successfully to be authenticated. One approach that can be employed in this context is to estimate the probability of someone luckily guessing a particular question, and then provide enough shared knowledge questions having low probability that a correct answer can be guessed, to ensure that there is a low probability that a person can guess all of the shared knowledge questions required to be answered to gain access to the one or more resources.

Implementations of this feature can use many methods to achieve this result. One envisioned method is to sample five questions randomly from the union of a set of shared knowledge questions that the user has successfully answered and a different set of shared knowledge questions that the user has authored, and authenticate the user if-and-only-if the user can successfully answer all five questions.

A more statistically robust and precise approach is to derive a statistical formula that estimates the probability of a person who is not the intended user guessing a question correctly, and then only accept sets of correct guesses to shared knowledge questions that, according to this statistical analysis, pass a threshold of likelihood that is deemed acceptable for the specific use of this novel approach for controlling access. One such method, not to be interpreted as limiting, uses the following statistics:

$p_i$=estimated probability of a random guesser (guesser who the content owner did not intend to have access to the system) correctly answering a shared knowledge question i.

P=probability that a random guesser will answer all questions in a set of shared knowledge questions and gain access.

$P=\Pi p_i$.

Then, the system can determine values of $p_i$ for each shared knowledge question and compute the likelihood of a user correctly guessing the answers to all shared knowledge questions. In whole, this approach can provide a user with a random sample of questions, such as five, and the user can guess answers to each question. After every guess, the system can recalculate the product P, and if P is greater than a predefined threshold determined to be appropriate for the specific use of the authentication, it can deem the user authenticated. If the shared knowledge questions sampled are not sufficient in number to reach the predefined threshold, even if all are answered correctly, the system can choose more shared knowledge questions to sample and challenge the user with those additional questions.

In implementing this feature, shared knowledge questions are chosen so that there is little overlap in the groups of people that have successfully answered them. The reasoning behind this strategy is that it is more robust to choose one question about a user's family, one about work colleagues, and one about drinking buddies, than to choose three shared knowledge questions that are only about a user's family. Mathematically, it is possible to formally show that the estimated strength of a set of shared knowledge questions is less if a set of people have answered multiple shared knowledge questions in that set.

This form of additional authentication (multiple shared knowledge questions) can be used, for example, for password recovery when a person forgets their password, needs their identity verified for credit lines, asks for changes to their credit line, bank account, or cellular contract over the phone, or other situations in which a person's identity must be proven.

Reusing Guesses to Shared Knowledge Questions

There are many applications for reusing shared knowledge questions compiled by a user. For example, user A might want to reuse a shared knowledge question that user B provided, if he/she wants the same people to have access. This reason for reusing could also be classified under various categories, such as: suggesting questions, if the question is suggested to the user; or variations on shared knowledge questions, answers, and safe boxes, if this is implemented by allowing a user to extend an existing safe box; or easy mailing lists and other lists, if it is implemented by allowing a user to drag the user interface object representing the users who answered the question correctly, onto a new object or box.

Questions can also be reused for marketing purposes and for studies of consumer behavior. This information can be used to develop and test models of consumer behavior. For example, the system can suggest to a content owner to ask the shared knowledge question "my favorite X is _____?," where X may be some person, place, or thing the system is interested in gathering information on. Examples are:

"My favorite beer is _____?"
"My favorite band is _____?"
"My father's favorite singer is _____?"
"My family's favorite place to vacation is _____?"
"My favorite Disney character is _____?"

Allowing Inexact/Ambiguous Guesses

One problem in a system that accepts answers to shared knowledge questions for access control is that the guesser may not type the answer exactly as the sharer types it when entering one or more acceptable answers. For instance, the guesser might guess "spaghetti with meatballs" instead of an expected answer "spaghetti," or might misspell one or more words in an otherwise acceptable answer. A solution for this problem might be to allow the sharer to define a space of allowable answers, such as by writing a regular expression that proposed answers that are entered must match rather than specifying a single exact answer. With this approach, the user must provide additional information to the computer system, beyond a single expected answer, in order to describe to the computer system the range of guesses that should be allowed. Another potential solution requiring additional effort is allowing the sharer to specify multiple alternative answers that include likely variations of the sharer's initial accepted answer(s).

However, regular expressions are difficult for users to learn and are difficult to write. As an alternative, it is proposed that shared knowledge question systems execute one or more automatic inexact guess matching algorithms. An automatic inexact guess matching algorithm is an algorithm that is provided an input of an exemplary acceptable answer (in the form of a text string or other description), i.e., an acceptable answer, and a guess (i.e., a proposed answer), and determines without further user input whether the guess is sufficiently close to the exemplary acceptable answer for it to be considered "correct." The algorithm does not require the sharer to explicitly say what range of ambiguous answers to accept, but instead, uses rules and/or computations to automatically decide whether a guess is sufficiently close to the sharer's answer to be considered a correct answer. Various sets of rules or computations can be used for this purpose, and the following discussion is not intended to be limiting of this concept as applied to the use of shared knowledge questions for controlling access to resources.

An exemplary implementation of such an algorithm uses three techniques to automatically evaluate inexact guesses: (1) it ignores minor word variations along linguistic dimensions; (2) it allows users to over-specify answers along linguistic dimensions; and, (3) it allows proposed answers or guesses to vary in the order in which words are phrased therein. For (1), the exemplary implementation uses a predefined threshold for a Levenshtein distance between words and stem words. For (2), the exemplary implementation ignores a number of extra words. For (3), the exemplary implementation ignores the order of phrases completely and just checks that each word in the answer has a corresponding word in the guess. Via this set of three sub-methods, an exemplary implementation of the general method of automatic inexact guess matching supports the specification of access control in a "by-example" fashion, without requiring sharers to describe abstract rules that bound the possible space of acceptable guesses.

Helping Sharers Understand the Test Guessing Algorithm

One issue that arises with guess matching algorithms, whether they are automatic or require user input, is that the user may find it difficult to determine what the space of allowable guesses is. Regular expressions, for instance, are often difficult to understand, and the sharer may not understand how an automatic guessing algorithm works.

As a solution, the system may allow the sharer to test the guess matching algorithm and specified answer on example guesses, and the system can tell the user whether the example guess passes or not. Using this approach, the sharer can provide a few examples until he or she is satisfied that the algorithm behaves appropriately. The system can do this by providing a special "guess testing" feature. For instance, there can be a text box on the screen next to the place where the sharer defines questions, or a box that the sharer can invoke by clicking a button, into which the sharer can enter test guesses, and the system can say whether the test guess is judged to be correct or not, for instance by displaying "correct" or "incorrect." This testing feature can be implemented by using the same algorithm as is used to actually test guesses. FIG. 6, which is discussed below, provides an example of this feature.

In order to simplify the design, the system can omit a special interface for testing guesses as described above, and instead, provide the sharer with an ability to view his or her content as any other viewer would. For instance, the system can provide a feature enabling a sharer to view his or her own profile on a social networking site, navigate to a question, and attempt to answer it by specifying a test guess. If the guess is correct, the system can inform the user. One way to inform the sharer is for the system to act exactly as if another user had entered the correct guess, e.g., by displaying the hidden content. In addition or instead, the system can display a message saying that the guess was correct, and/or make it easier for the sharer to change their guess and/or guess again to further evaluate how the system is handling such guesses.

Finally, since guess limits (described herein) can prevent a guesser from making many guesses, the system can give the sharer a special override ability. One way to do so is to allow a large or unlimited number of guesses by the sharer. Another way is to provide feedback to the sharer when the guess limit has been reached (such as by displaying a dialog box or a small unobtrusive message next to the guessing box that says "Your guess limit of five guesses has been reached") and then still allow the sharer to easily continue testing the response of the system without navigating to the normal interface for resetting guesses. For instance, an interface can be provided in that screen for resetting the guess limit or resetting the guess limit automatically and optionally displaying a message such as "the guess limit has been reset since you are the sharer." A system can also display a running tally of the guess limits. Since there can be multiple guess limits (global for all users, per user, and per question, and per user-question pair), the above techniques can be used for any set of these guess limits.

Apart from guess testing, another solution is for the system to generate a few exemplary guesses that are judged correct and/or incorrect. This approach reduces the user effort. Thus, for an acceptable answer of "spaghetti," the system can tell the user that the guesses "spaghetti with meatballs" and "spaghettis" will both be judged as correct, but that the guess "pasta" will not. For the automatic inexact guessing algorithm described in this document that allows additional words and small Levenstein edit distance differences within phrases, additional correct guesses can be generated by adding arbitrary words, or related words or phrases (as determined by a latent semantic analysis over some text corpus) to the acceptable answer, and modifying spelling within the allowed edit distance. Exemplary incorrect guesses can be generated by arbitrarily changing letters beyond what is allowed by the edit distance, and finding synonyms that are not allowed.

A third solution is to describe the algorithm used in English. For instance, by indicating that typical spelling errors are tolerated, and extra words can be provided if they over specify an accepted answer.

Allowing Multiple Answers to Shared Knowledge Questions

Questions or tests may have multiple answers. A system can allow the question creator to specify multiple answers for shared knowledge questions. For example, the shared knowledge question "what does my dad do for a living?" can have both "lawyer" or "attorney" as possible acceptable answers. In this example, the answers are synonyms, but a system can allow the question creator to specify multiple answers that are not synonyms. For example, the shared knowledge question "what is my favorite drink?" can have both "rum and coke" and "Rainier" as two alternative correct answers specified by the sharer.

One reason to allow multiple answers is that different groups of friends may correctly perceive different answers to the same question. In certain circles, the content owner or question creator may be perceived to prefer to drink one beverage and in other social circles, be viewed as preferring to drink a different beverage. For example, a recent law school graduate's friends from law school may perceive her favorite drink to be a specific brand of beer, but her colleagues at the law firm where she is now employed may perceive that her favorite is Scotch, if that is what she drinks now when socializing with them. If the content owner desires that both groups (her school friends and her work colleagues) be able to access the protected content, he/she can specify both answers as acceptable.

An exemplary interface screen shot 260 that supports multiple answers appears in FIG. 12. On the left side of this web page, shared knowledge questions 262, 264, 270, 272, and 274 are displayed. In the example shown in screenshot 260, a sharer has entered a shared knowledge question 264, "Bert the owl says _____?" and has just entered two answers 266 and 268, both of which are acceptable. Protected content or resources 278 that will be accessible if the shared knowledge question is answered with either of the acceptable answers are shown on the right. One way to allow the sharer to add an additional acceptable answer is to provide a button 261 that appears next to an answer or text input box 268 where a sharer has last entered an acceptable answer to the shared knowledge question. In this Figure, the button has a plus ("+") identification on it. Clicking button 261 makes a new text input box appear. When the user hovers the mouse cursor over the text input box, a small red X appears at the box's upper-right that can be clicked to delete an answer (not shown in the Figure). The sharer can add a new Safe Box that includes other protected content or resources by clicking on a control button 276. Recent guesses 277 to shared knowledge questions of the sharer are shown on the lower left of the screenshot and images of people who have been granted access to resources 278 are included at the bottom of the webpage in a box 279.

When a user guesses an answer to a question with multiple acceptable answers, an exemplary system can use various known algorithms to determine whether the guess matches any of the acceptable answers. One such algorithm checks each alternative acceptable answer in turn. For each alternative acceptable answer, if the guess matches that answer (using the existing guess matching process described herein), the algorithm declares a match. If no answer matches, the algorithm declares no match.

Helping Sharers Design Good Questions

An exemplary system predicts question "guessability" (or question difficulty) and shows this parameter to a person when they are creating a question. This feature can be thought of as being similar to the conventional password strength meters currently provided in some e-mail programs and in other types of applications.

One method of evaluating question strength is to determine if the acceptable answer to a shared knowledge question is part of an easily-enumerable set (e.g., a color, a type of drink, a day of the week, etc.). One way to do this is to use GOOGLE™ sets. Another is to create a database of sets, such as days of the week or colors, and scan all questions to determine if their answers are members of any such set in the database.

Another method for determining shared knowledge question strength is to use a database (like the Web) for things related to the shared knowledge question (for example, using the question as a query) to see if the answer is in the results. Additionally, a database of easy questions can be kept, and each new shared knowledge question can be checked against those in the database to determine if it is an easy shared knowledge question.

When users are operating the system, they can be provided a rubric "here's how to make good questions: don't use things people can search for on the Internet; don't use questions with only 5-10 answers." The rubric may warn them about the issues listed above (such as an answer being a member of an easily enumerable set) that can reduce the strength of questions.

Methods Used by the Present System for Suggesting Questions

Scanning any data about a person and the person's friends (the person's profile, the friends' profiles, the person's usage history and/or purchasing history at physical retail stores if available, or the person's email conversations) can provide insights that can enable the system to suggest questions or categories of questions. The system might come up with questions without knowing the answer. For example, if the system can find that a person lists "beer" as an interest, it might suggest a question "what's my favorite beer?" and have the sharer fill-in the answer. If the person uploaded some specific content, it can suggest targeted questions that are likely to be appropriate for that content. If the person is uploading photos that are likely to be party photos, the system can suggest a question "what drink was served?" or suggest "try using a question about drinks that were served, or the party's theme, or some particular memorable event that happened at the party." Suggested questions can be derived from a database of questions or categories of questions associated with corresponding interests and activities known about the person.

Suggesting questions, as a side-effect, helps deduce knowledge about the sharer. For example, if the system suggests that the sharer use a question "what's my favorite beer?" and leaves the answer blank, when the sharer fills-in the accepted answer, the system will know what his/her favorite beer is and that information, which is valuable, can be employed for targeted advertising directed at the sharer, and targeted offers that are likely to be of interest to the sharer. In such an implementation, a consumer research company can use the data or send a message to prompt the sharer to answer the shared knowledge question.

Shared Knowledge Question Event Notifications

The present exemplary system can take actions to notify users of events involving shared knowledge questions, to keep them up-to date, and for instance, let them know that there are new shared knowledge questions for them to answer or content behind a shared knowledge question they viewed. Some examples of the events of which a system can notify users are as follows:

1. When new content is added that is protected by a shared knowledge question that the user correctly answered in the past.
2. When a friend, associate, or other relation of a user (as determined in any way) makes a new shared knowledge question, changes a shared knowledge question, or changes the content to which a shared knowledge question is applied.
3. When another user adds or uploads more content behind a user's shared knowledge question, or borrows a shared knowledge question for their own use, or makes a similar shared knowledge question, where "similar" might be defined by textual Levenshtein distance (aka edit distance) or employs a more complicated algorithm.
4. When another user answers one of a user's shared knowledge questions (either correctly or incorrectly).
5. When a user is explicitly or intentionally given access to the content behind a shared knowledge question, such as via a whitelist, by another user.
6. When a user attempts to answer (either incorrectly or correctly) a "friend's" question and gains access to the protected content. "Friend" here can be someone they are connected to online in some way, for example.
7. When one of their "friends" attempts to answer (either correctly or incorrectly) a shared knowledge question about another user and gains access to their protected content.

In the examples listed above, the notification may be sent in various ways, such as to a user's email account, by a text message, or placed in a "news feed" or other list on a website, or included in an arbitrary visualization.

In an exemplary implementation, a news feed item on Facebook™ appears that says "John Doe uploaded 43 photos to the site protected by the secret question 'what is cousin Vittie's nickname?'," or "John Doe added a new secret question 'fifty eight cards under a _____?'" Users can click on the shared knowledge question to reach a page that lets them guess the answer, and consequently view the photos or files. In addition, the first item about new files can be sent directly to any user who has already answered the shared knowledge question in the past.

Web Service

The present exemplary novel system maintains a central repository of a user's shared knowledge questions. Third parties are able to connect to this repository via the Internet (or some other network).

Users are able to reuse the questions they made for one website on another website, if both sites use the same web service. This web service may be hosted on multiple sites. This service is valuable because there is currently no way to establish that a user's accounts on two websites represent the same user. Thus, users must have their friends "add them" or create whitelists on every website on which they want to share content and maintain these friends in identical access control lists on every such website.

The web service enables shared knowledge based access control to work for websites that don't directly implement the present novel service on their system, but do implement traditional access control lists. Even if a website does not connect with the web service that uses shared knowledge questions as described herein, a user may give this web service their username and password for the website, and the web service may login to the site on behalf of the user and manipulate the white/blacklists behind the scenes on behalf of the user whenever someone successfully answers one of the user's shared knowledge questions. If a user answers a shared knowledge question in the web service using the present novel approach, and the web service knows that user's account name on the website and the sharer's website password, the web service can add the successful guesser to the protected content's whitelist.

User Interface for Accessing Content Guarded by Shared Knowledge Questions

A novel user interface enables users seeking access to content guarded by shared knowledge questions to easily answer shared knowledge questions and access that protected content. The exemplary version of the user interface described herein is in terms of the Facebook™ platform, but the user interface innovation can be used on any system and virtually any application and is not limited only to Facebook™. The user interface and the operations a user would take when accessing the content are explained below, for this exemplary application.

A user (the "viewing" user) views a webpage, screen, file system directory, document, or other virtual browsable location or "view" for which some content is protected by one or more shared knowledge questions. For instance, a user might visit a Facebook™ user's profile page. Note that the conventional way of implementing an interface for gaining access to categories of content is to select or otherwise navigate to the category of content desired (such as a "family" category of content or a "my school's art community" category of content) and then request access for that category and provide credentials (such as by entering a password). In contrast, if using shared knowledge questions to control access, the answer to a question or set of questions) for that category can be entered instead. However, this approach has the downside of exposing to the viewer information such as the names and types of categories present in the sharer's protected content, as well as the fact that such private categories exist, and generally requires the viewer to take the extra step of selecting and/or requesting access for a category before providing the user's credentials (or acceptable answers to one or more shared knowledge questions) to gain the access.

Since a sharing user may not want all potential viewing users to know the categories of hidden content, or perhaps even that some content is hidden at all, a user interface can instead only present all the shared knowledge questions that guard protected content available in a view, but without displaying or providing information about the categories themselves that are protected by each shared knowledge question (see the examples in FIGS. 9 and 10). Optionally, even shared knowledge questions that do not protect any content on that view can be displayed, making the viewer uncertain as to whether there actually is any protected content hidden on the page if it appears that some shared knowledge questions guard nothing.

The following exemplary computer interaction method enables the viewing user to go through this list of shared knowledge questions and answer all the ones he/she is able to answer.

When a user "clicks" on a question, an answer box appears in which the user can type the answer to the question. The answer box is displayed below the question so that the question is still visible while it is being answered. If there are other questions present on the content sharer's page, they are also visible to the user. Since the other questions are visible, the user can switch to another question if they desire by clicking on those other questions. Exemplary screenshots of the user interface are shown in FIGS. 9 and 10.

If the question is a short answer question, the box is a standard text box where the user types the answer to the question and then submits the answer by, for example, pressing enter on their keyboard or clicking on a button such as the one shown in the Figures labeled "Open."

If the question is not a short answer question, the user is presented with an appropriate method for answering the question. Again, the space for entry of a proposed answer to the question pops up after the user has "clicked" on the question. This interface is the same for both short proposed answers to shared knowledge questions and other types of tests. An example of an appropriate method for answering a shared knowledge question for the case of multiple choice questions is a group of radio buttons for selecting the correct answer from among a set of possible answers.

An additional, but not requisite, aspect of this exemplary method is that for all types of shared knowledge questions, if the user has answered the questions correctly, the content behind the shared knowledge question then immediately appears on the webpage and the user thus becomes aware of the type and amount of content they have unlocked or accessed. For example, a user might receive the message "you just unlocked five photos, and three profile items" after gaining access to protected content. The webpage may be a profile page, photos page, blogging page, or some other type of webpage. FIG. 11 shows an exemplary screenshot 250 of this process. A shared knowledge question 252 "what does TPG make?" has been answered in a text box 254 with the proposed answer, "coffee." But screenshot 250 does not indicate what protected content will be accessible after the shared knowledge question is correctly answered.

If the content sharer has specified that multiple questions must be answered before content can be accessed, the user seeking access to the content must correctly answer those other questions before he/she is able to access the content. These other questions may be a set of questions or a single question. In any case, the same user interface setup described above, where an answer box appears after a question is "clicked" and where content (or another question) appears after a question is successfully answered, is used. With this setup, many questions can be chained together or linked to other questions, which eventually lead to access of the protected content. In other words, successfully answering one or more shared knowledge questions may be required to first view the specific resource that might be accessed, but actual access of the one or more resources can depend on the user successfully answering still another one or more shared knowledge questions.

After each question is answered, the content that is unlocked by answering that question can immediately appear in the page without reloading the page and be highlighted with a background color that slowly fades away to neutral to help guide the user's eyes to find the new content. Clearly, this approach is exemplary, and other methods of presenting the protected content or resources can alternatively be employed.

Variation on Questions Answers, and Safe Boxes

Allow Multiple People to Apply Questions to The Same Content, And Add/Change Content in Same Questions In some exemplary embodiments, viewers (not just the initial sharer) are able to add shared knowledge questions for the content they see. For instance, if a party photo album is uploaded by one person, another person who was at the party and is granted access to the album can share it with his friends by adding a new shared knowledge question that his friends can answer.

At a more general level, an exemplary implementation of this feature can choose to give viewers who have been granted access to a category, any of the abilities that a sharer has, such as the ability to:

1. Change, manage, or delete the questions controlling access to the protected content;
2. Edit whitelists/blacklists controlling access to the protected content;
3. Upload photos or other additional protected content, or comment on protected content, etc.;
4. View a list of recent failed or successful access attempts; and
5. Set options, such as the number of allowable guesses for a question.

In one exemplary implementation, the initial sharer is able to specify the permissions that viewers inherit by virtue of being granted access to a Safe Box (or protected content). On the sharer's screen (not depicted in the figures) is presented a menu of options that enable or disable the ability of viewers receiving any of the five abilities just described. For instance, a checkbox can be selected to "allow viewers to share photos with their friends where access to those photos is controlled by their own shared knowledge questions." If this option is selected, the viewers can click a button called "share" (FIG. 14) when they are viewing the category of content, which will result in the content appearing in their question-specification page as well, allowing them to make their own question and answer for it. The initial sharer is thus an "administrator," who is able to specify other administrators. This function is similar to using shared knowledge as an access control within a "group" or "event" on Facebook™, which enables users to specify admins and regular users in whitelists and gives different permissions to each.

In the example shown in FIG. 14, a viewer has answered two shared knowledge questions 290 and 292 and is currently viewing protected content 302 associated with one of them (i.e., the selected tab for question 292). Other shared knowledge questions 294 and 296 are included, and an answer text box 300 is displayed for a shared knowledge question 298. In this example, each question has a one-to-one mapping to a category of protected content. If the user clicks a control 293 labeled "reset," the shared knowledge question will go back to an unanswered state and require the user to re-enter the proposed answer the next time he wants to view the files. The system (or sharer) can choose whether to display the user in the access logs after the user has clicked reset. In one exemplary implementation, the access log still shows the user until the sharer changes the shared knowledge question. Three shared knowledge questions have not been answered, and one is selected to allow the user to answer it. The user's guesses appear at the bottom of the screen, giving the user awareness that they are being logged. The user can share the content with other people by clicking a share button 303, which will let the user provide a new question for controlling access to it. The user can add more input to this same question by clicking a button 304 labeled "Add to this box."

Analogously, there can be an "upload" and/or "add" and/or "change" button(s) on the view screen (not shown in this Figure) that viewers see when they answer a question.

Multiple Shared Knowledge Questions as "Union/or" Instead of "Intersection/and"

The present novel approach allows content owners to specify multiple shared knowledge questions or sets of shared knowledge questions for a particular resource or group of protected content resources. Users can answer one of many shared knowledge questions (one out of a list of shared knowledge questions) and gain access to one or more groups of protected content or resources. Further, the approach also permits arbitrary Boolean combinations of shared knowledge questions (e.g., a union of question A and question B, and can provide access if either question A or question B is answered correctly), which the content owner may specify. Or the content owner (or system) may specify the specific number of shared knowledge questions that should be answered to gain access to the resource(s). For example, a user might be required to answer ¾ of these shared knowledge questions correctly to gain access to the protected content (see the discussion above on controlling access by only allowing people to do so who have a degree of relation above a predefined threshold).

Alternative Approaches to Resetting Access when Shared Knowledge Questions Change When a sharer changes a shared knowledge question, all viewers are not necessarily removed from the access list (whitelist). If this step were implemented, all of the users on the access list would be required to re-answer all the old shared knowledge questions, along with the new one. Additionally, the system does not remove users from a whitelist if a new shared knowledge question is added to the same safe box.

Time Limits to Answer Questions.

A user can be required to answer a shared knowledge question within a specified amount of time. This feature prevents a user from using a search engine or other reference to find the answer. For example, a user can be required to answer a shared knowledge test within 30 seconds. It will be understood that the content owner may specify the amount of time allotted to a guesser to be either a shorter or a longer period, and 30 seconds is merely an example, but not intended to be limiting.

Additionally, time limits can be imposed to answer sets of questions. For example, a user attempting to gain access to a website about lawyers might be required to answer a specified number or list of shared knowledge questions within a specified amount of time, to be successfully authenticated on the website. The specific number of questions that must be answered and the time limit may by be specified by the content owner.

Dummy Content

The present exemplary system can use dummy content to throw a user off and to minimize guessing the correct answer. A content owner may specify that specific users be added to a blacklist where they will automatically be directed or sent to dummy content when they attempt to access content.

If a user is blacklisted or placed on the "dummy content" list, but answers a question successfully, or is not on a blacklist but guesses unsuccessfully, they may be shown dummy content to fool them into thinking they had been granted access to the actual protected content. This step is carried out to prevent social awkwardness when a user is denied access to protected content or does not know the correct answer to a shared knowledge question.

Honeypot Questions

An exemplary embodiment of the system can use "honeypot" shared knowledge questions to determine if the system has been compromised or the guesser is attempting to compromise the system. These are shared knowledge questions that don't have a true correct answer. If someone is trying to answer them, they are trying to hack the system or use the system in an unintended way. Additionally, these honeypot questions may be used to deflect attempted access by computer bots.

Smart Question Selection

It can be preferable to give different shared knowledge questions to people with different properties or relationships to the sharer. For example, people in the sharer's High School group may not be provided any shared knowledge questions, people in the sharer's University group may be provided shared knowledge questions $Q_1 \ldots Q_r$, and everyone else may be provided shared knowledge questions $Q_{\{r+1\}} \ldots Q_s$.

Example:

Question 1 (Please select all that apply): How do you know me?

[ ] Family;

[ ] Fairview High School;

[ ] University of Washington;

Question 2 (if above answer includes Family);

Question 2 (if above answer includes Fairview High School);

Question 2 (if above answer includes University of Washington).

Exemplary Computing Device for Use in Practicing the Method

Figure 4:
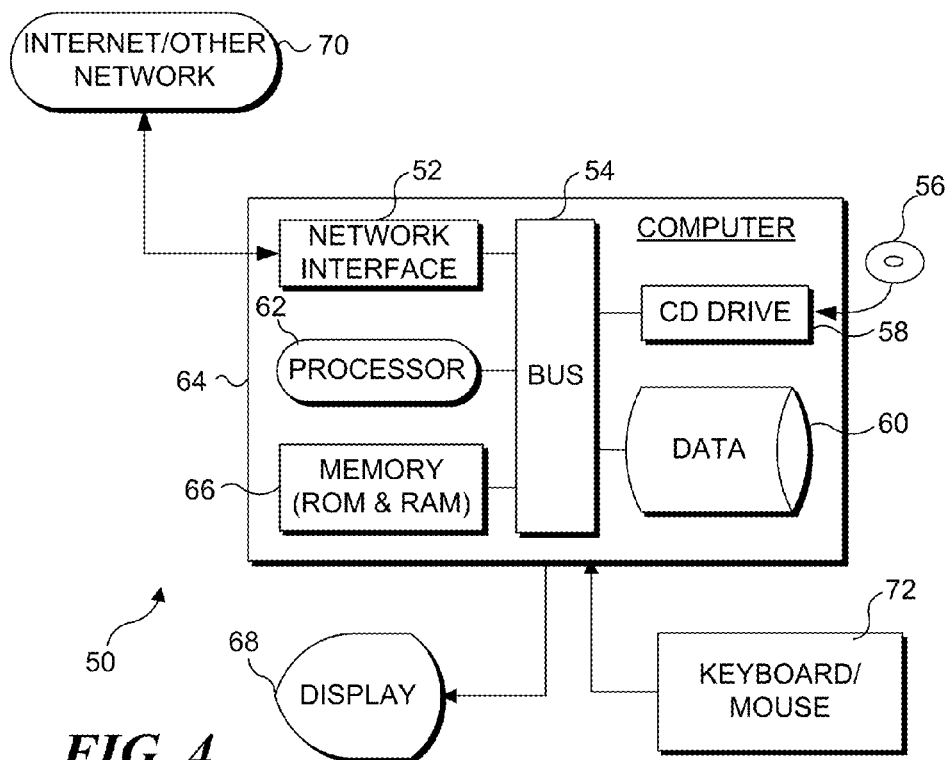
FIG. 4 is a functional block diagram of an exemplary typical personal computer that can be employed by a user creating or selecting a question to control access to the user's online data, or by another user that is accessing the online data by answering the question.

FIG. 4 schematically illustrates an exemplary system 50 suitable for implementing the present novel technique—by the user who is seeking to control access to data or resource(s) that are to be shared, by employing a shared knowledge question that should be correctly answered to access the resource(s) by one or more parties intended by the user or sharer to be able to access the resource(s). The one or more parties should have the knowledge needed for answering the shared knowledge question, while others will likely not. Computer 64 may be a generally conventional personal computer (PC) such as a laptop, desktop computer, personal data assistant, or other form of computing device. Computer 64 is coupled to a display 68, which is used for displaying text and graphics to the user (i.e., to the sharer or the user trying to access the shared resource). Included within computer 64 is a processor 62. A memory 66 (with both read only memory (ROM) and random access memory (RAM)), a non-volatile storage 60 (such as a hard drive or other non-volatile data storage device) for storage of data, digital signals, and software programs, a network interface 52, and an optical drive 58 are coupled to processor 62 through a bus 54. Optical drive 58 can read a compact disk (CD) 56 (or other optical storage media, such as a digital video disk (DVD)) on which machine instructions are stored for implementing the present novel technique, as well as other software modules and programs that may be run by computer 64. The machine instructions are loaded into memory 66 before being executed by processor 62 to carry out the steps for implementing the present technique. The memory can also either store one or more resources to which access is being controlled, or may store information that is used to access the one or more resources, such as a Web address or a file path on non-volatile storage 60.

The user employs computer 64 to select or create a question to control access to the resource(s) of the user when processor 62 executes the machine instructions stored in memory 66. These machine instructions cause the processor to solicit the user to create or select a shared knowledge question if the computer is that of the user (or sharer) controlling access to the data, and solicits entry of a proposed answer to the shared knowledge question, if the computer is being employed by the party attempting to access the resource(s). The resource(s) being accessed can be stored on storage 60, but more typically, will be stored on a separate storage—not shown in FIG. 4, which are accessed by the connection to Internet/other network 70 through network interface 52. Prompts to select or create a shared knowledge question are displayed to a user on display 68. Alternatively, when the PC is the computing device being used by a party seeking to access the resource(s), display 68 will present the shared knowledge question that must be answered by the party to gain access to the resource(s). The shared knowledge question or the proposed answer to the question can be input to computer 64 using a keyboard/mouse 72. The processor will then determine if the proposed answer sufficiently matches one or more acceptable answers that were specified by the user (or sharer) controlling access and if so, will grant the party access to the resource(s). If not, or if other considerations (such as the party being on a blacklist) preclude the grant of access to the resource(s), the party will be denied access or may instead be directed to a dummy resource. More details about the functions carried out by the processor are discussed herein in connection with FIG. 8.

Network Access of Data or Other Resources

Figure 5:
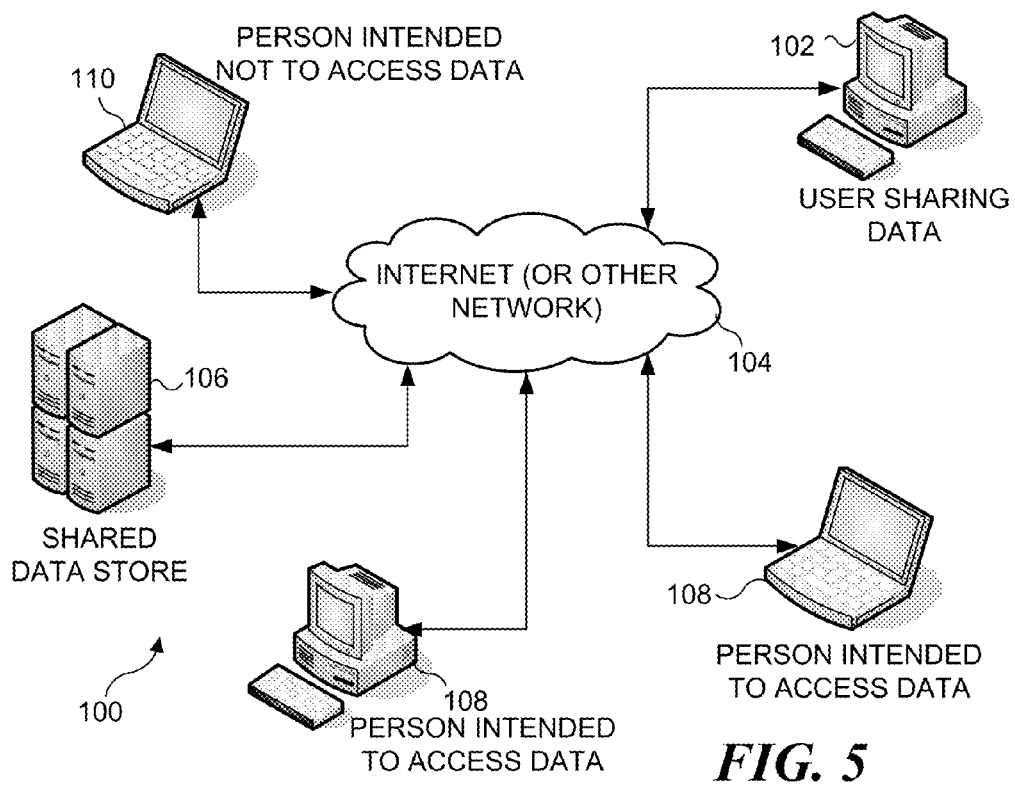
FIG. 5 is a schematic diagram of a simple network that employs the present approach to control access to the data of one user by one or more other users.

FIG. 5 illustrates a network 100 over which shared protected content or resource(s) can be accessed. A user 102 may be coupled to Internet (or other network) 104 used to access the shared resource(s), which can be stored on a shared data store 106, e.g., on a server storage accessible over the network, or on a hard drive of the sharer's computing device. Once user 102 has established the shared resource(s) at shared data store 106, the user can be prompted to create or select a shared knowledge question that can likely be answered by a specific group of one or more persons, based on a high likelihood that people included in this group will have or share the knowledge needed to answer the question (and those who are not included in the specific group will be unlikely to correctly answer the shared knowledge question). For example, the user (or sharer) may believe that persons 108, who are intended to access the shared resource(s), will be able to provide the correct answer to the shared knowledge question created or selected by the user, because their relationship or social context to the user places those people (or that person) in a position to likely know the answer to the shared knowledge question. However, persons who are not in the specific group, such as a person 110 who does not share the knowledge needed to answer the shared knowledge question selected or created by user 102 (or automatically created by the user's computing device), will not be able to answer the question and therefore, will be unable to access the shared resource(s) of user 102.

Exemplary Screenshots

FIG. 6 shows a screenshot 160 of a shared knowledge question management application running on the Facebook™ platform. The working name of the application is "Our Privates" and this exemplary application has been tested with multiple users to perform the functions described herein.

Note that a shared knowledge question or test 162 that was entered by the user is shown, i.e., "What is cousin Rodney's catchphrase?" and is an example of a typical textual short answer shared knowledge question. An input box 164 is provided for entry of an acceptable answer 168 to the shared knowledge question by the user (or sharer). The screenshot also includes a check box option 166, which has been checked by the user to indicate that inexact answers are allowed.

The content owner could have selected another type of test using shared knowledge, such as a multiple choice question, or a question asking the person seeking to access the shared resource(s) to name one or more individuals in a photo (similar to a police lineup). Accordingly, it will be understood that as used herein, the term "shared knowledge question" is intended to broadly encompass any form of test or question that is intended to be answered using knowledge shared with the a user controlling access by one or more other people who should be able to correctly respond to the shared knowledge question.

In this example, a music file (.mp3 format) is the content that is being shared with one or more other users who know the answer to the shared knowledge question. In an exemplary application, the Amazon S3™ storage service is used to host the music file, while the actual application is running on a server at the University of Washington. Users seeking to access the music file must pass the shared knowledge test. As mentioned above, the system is designed so that the content owner knows, or is reasonably certain of who would know the answer to the question, "What is cousin Rodney's catchphrase?" A guess can be tested in an input box 170 to enable the sharer to determine whether an inexact guest that is entered will be properly evaluated by the inexact guess matching algorithm, as discussed above.

Under the Recent Access column 172 shown in the bottom left of FIG. 6, the guesses that have passed the test are shown. Since the "Allow inexact matching" option is selected, the matching algorithm was applied to each guess that was entered. Also, note the four unacceptable guesses listed under a Recent Failed Access column 174.

Exemplary Screenshot of Private Access Entry Page

Figure 7:
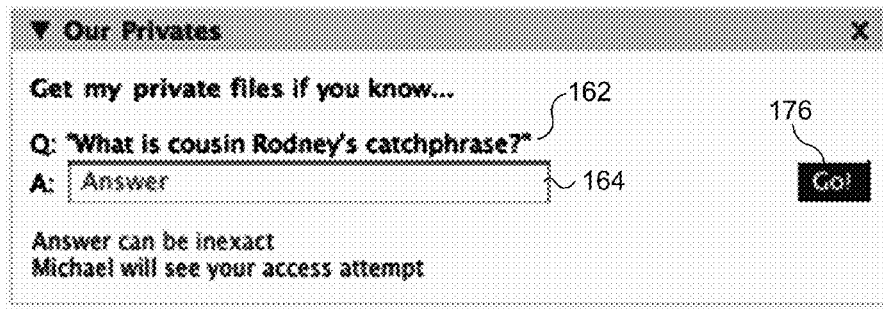
FIG. 7 is an exemplary screen shot illustrating a private access entry page of a shared knowledge access control application deployed on Facebook.

FIG. 7 shows another screenshot 180 of an exemplary shared knowledge application on the Facebook™ platform. A user attempting to access the content types their answer to shared knowledge question 162 into input box 164 and clicks a "Go!" button 176. The system then determines if the proposed answer is acceptable and if so, the user is granted access—unless precluded for some other reason, as discussed below.

Flowchart of Access Control Procedure

Figure 8:
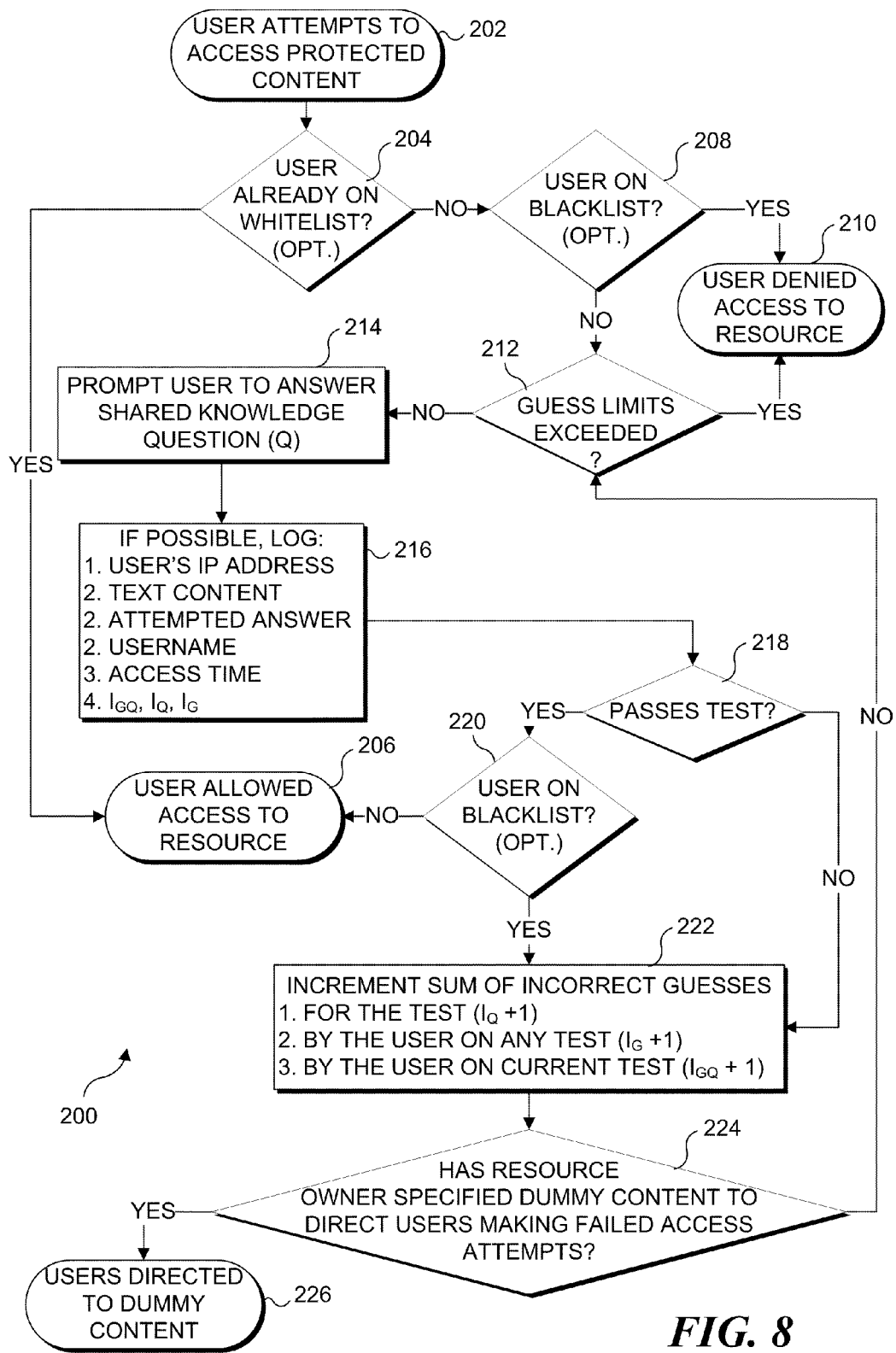
FIG. 8 is a flowchart illustrating exemplary logical steps for implementing the access control procedure.

FIG. 8 is a flowchart 200 of the shared knowledge access control procedure, starting at the point where a content owner has already uploaded or saved their protected content (i.e., one or more resources) that is to be shared and has created a shared knowledge question or test to protect that content. The flowchart shows one exemplary scheme for controlling security via shared knowledge, and it is clearly not the only method contemplated. There are many possible permutations of the illustrated exemplary procedure, along with other options that may be added into the access control procedure.

The flowchart begins with a step 202, where a user attempts to access the protected content or resource, for example, over a network such as the Internet. An optional decision step 204 determines if the user is already on a whitelist (i.e., on a list of users who have been approved to access the protected content). If so, the user is simply allowed to access the protected content or resource in a step 206. If not, an optional decision step 208 can be included to determine if the user seeking access to the resource is on a blacklist (i.e., on a list of users who are denied access to the protected content or resource). If so, the user is denied access to the resource in a step 210. Otherwise, a decision step 212 determines if the guess limits have been exceeded. Users seeking to access the protected content can be allowed or denied access based on their answers to the shared knowledge questions and further, upon whether any guessing limits (which can be set by the content owner or by some other entity) have been exceeded. The three types of guess limitations are fully described above in the discussion of Guess Limits. Also, the terms for total incorrect guesses by a user on a specific question ($I_{qg}$), total incorrect guesses by all users on a specific question ($I_q$), and all incorrect guesses by a single user on all of the shared knowledge questions that the user has attempted ($I_g$), are fully defined above in the Guess Limits section. Thus, if the guess limits are exceeded, the user is denied access to the resource in step 210. If the guess limits are not exceeded, a step 214 provides for prompting the user to enter a proposed answer to the shared knowledge question, q. A step 216 provides that if possible, the computing device will log data (identified by preference—from 1 to 4) that includes the user's Internet protocol (IP) address, the text content of the shared knowledge question, the attempted or proposed answer entered by the user, the user's name (or other identifier), the time of access by the user, and the total number of incorrect guesses by the user to this specific question ($I_{qg}$), the total incorrect guesses by all users on the specific question ($I_q$), and all incorrect guesses by a single user on all of the shared knowledge questions that the user has attempted ($I_g$).

A decision step 218 then determines if the proposed answer entered by the user has passed the test (i.e., if the user's proposed answer was accepted as correct by the computing device). This step can include the step of employing the computing device to apply an inexact matching algorithm to the proposed answer entered to determine if it inexactly matches any of the accepted answers to the shared knowledge question. If the user's response is acceptable as an answer to the shared knowledge question, an optional decision step 220 can determine if the user is on a blacklist. This step would typically not be employed if decision step 208 had been used, since there would be no reason to make this determination a second time. If the response to decision step 220 is negative, the user is allowed access to the resource in step 206. However, if the user is on a blacklist and is not intended to access the resource, or if the user's response did not pass the test in decision step 218, then, a step 222 provides for incrementing the sum of incorrect guesses: (1) for the current shared knowledge question by any user failing to provide an acceptable answer; (2) by the current user on any shared knowledge question; and (3) by the current user for the current shared knowledge question.

In this exemplary flowchart, the content owners or the user controlling access to the resource(s) are permitted to provide dummy content to content-seeking users who fail to successfully answer the shared knowledge question. This dummy content may be any form of content, but will most likely be something the owner of the protected content or resource does not care about keeping secure. For example, a content owner might select a picture of a fish they caught as dummy content and pictures of their children playing soccer as the protected content, although many other examples can readily be employed. Thus, a decision step 224 determines if the resource owner has specified a dummy content to which users will be directed if the users failed to gain access to the protected content or resource. If so, the user is directed to the dummy content in a step 226. Otherwise, the logic returns to decision step 212, which determines if the guess limits have been exceeded.

Using Shared Knowledge to Allow Browsing without Identifiable Groups

In traditional access control systems, viewers browse data to which they have access and can request access to data to which they do not have access. To request access, viewers generally select an identifier for the permissions group he/she wants to access, such as by clicking the identifier "Family" for a permissions group that includes the sharer's mother, father, siblings, and relatives. An identifier can be used with any form of access control. For instance, if used with shared knowledge, a viewer can first request access by clicking on the "Family," and then the system can validate that request by presenting the viewer with the shared knowledge question protecting the "family" group.

When using identifiers, the sharer wants the identifier to be easy for viewers to understand, so that they know the groups to which access should be requested. However, a sharer may not want everyone to know about such groups or classifications. For instance, a sharer might want to hide the existence of a secret club, or might be embarrassed if an employer found out that he or she is hiding content for the gay and lesbian community, which would be immediately evident if accessed behind the identifier "gay/lesbian community." In this case, the sharer will prefer to employ a more secret way of identifying the access permissions group that is not immediately evident to anyone who views a webpage of the sharer. Some solutions to this problem will typically require additional thought and effort by the sharer.

One exemplary solution to this problem that is illustrated on a screenshot 230 in FIG. 9 utilizes the shared knowledge questions themselves to identify groups—but not in the clear, which adds ambiguity to the existence of the groups while still allowing viewers to identify the ones to access. Thus, under a heading 232 that is entitled "Secret Stuff," shared knowledge questions 234, 238, and 240 are listed. In the example shown, a user has clicked on shared knowledge question 234, which has caused a text entry box 236 to open, so that the user trying to access the one or more resources can enter a proposed response. This user will likely only click on a shared knowledge question if the user feels some confidence in successfully answering it. Thus, by selecting the shared knowledge question that is displayed so that those who will be able to answer it are the ones the sharer would like to access shared resources protected by the shared knowledge question, the sharer can control the persons who will likely even try to access those resources and the classification of the shared resources protected by specific shared knowledge questions will not be evident to anyone by simply viewing the webpage.

This approach does not require additional effort from the sharer. Rather than list a set of identifiers on the screen (for instance, displaying the names of all permissions groups that can unlock content on a page of photos) that a viewer (i.e., a user) can click to access if successful in passing the shared knowledge test, this shared knowledge-based solution lists all of the questions that can unlock content, but without displaying any additional identifiers of the resources that will thus be accessed or, in fact, without requiring display of any other information about the groups. FIG. 10 is a magnified view of questions 234, 238, and 240 under heading 232, "Secret Stuff."

It will be evident that with this approach, the viewer does not need to select identifiers and groups, cannot see any names for the groups, and will likely only try to answer the shared knowledge question(s) that he or she can answer. This approach works because viewers are likely to recognize the questions that they can likely answer, and people who do not know the answer to a shared knowledge question are not likely to know the specific other people who will be able to answer them. Unlike the case where identifiers are provided, the user does not need to do extra work to find a name or identifier that the desired viewers will understand but which will not be understood by the undesired users viewing the web page, since he or she can effectively accomplish that goal by giving double duty to the specific shared knowledge question that protects access to each different resource.

An extension to this solution allows a question to exist that does not protect any content (but is just there for fun or for another reason). Thus, a viewer cannot assume that someone is hiding anything of interest just because there is a shared knowledge question that might be related to a resource. In addition, by using another extension of the idea, some questions may only appear in the list (and thus only be answerable) after a viewer has successfully answered one or more of a set of previous shared knowledge questions or otherwise been determined to be in a group that should be able to know of the existence of the new shared knowledge questions. This hierarchical or layered approach makes it possible to conceal the existence of groups, adding even more social ambiguity. Thus, in summary, shared knowledge questions can be chosen in a way to make the identity of groups difficult to discern by outsiders, while still facilitating access requests from the appropriate people, and without requiring additional thought and effort on the part of the sharer.

Finally, since this technique is particularly suited for situations in which a viewer is browsing data (for instance, browsing web pages on an Internet website) and periodically finding locations that contain access-controlled information, the interface and browsing task can be made even simpler by employing the following technique. Prior to a shared knowledge question being answered successfully, the screen can display only the publicly viewable content. After each question is answered successfully, the content made available by correctly answering the preceding questions can be displayed on the screen immediately in the location it belongs. In web pages, this technique can be implemented using client-side scripting and an in-page network data transfer request rather than a page reload, such as using Javascript and the XMLHTTPRequest( ) API in Web browsers. For instance, a viewer might answer a family shared knowledge question on a social networking site like Facebook™, and then within that page, the person's visible "wall" will start to include posts from people that have been protected with the family shared knowledge question, and family photographs will start to appear in the photographs section of the Web page.

Guarding Modifications, Posts, and Other Write Access with Shared Knowledge

The most readily apparent use of shared knowledge questions in a system, as described in connection with the above functionality, is to control the information a viewer can see. However, it is also possible to use shared knowledge to prevent a user from taking actions on a computing device that change the state of a computational system. Whereas the ability to view content or state is called read access, this ability to take actions that manipulate content or state is called write access.

Some examples will help to illustrate the power of this feature. A shared knowledge question can control who can make comments on a website, for instance a blog post 280, as illustrated in FIG. 13, wherein when a user tries to post a comment in a comment input box 282, the system first presents a shared knowledge question 284 that the user must answer correctly in an input box 286. Once the shared knowledge question is correctly answered, the user can click on a control button 288 to publish the comment(s) entered. The blog can choose a set of administrators allowed to configure the shared knowledge question or set of shared knowledge questions that express who should be allowed posting access. A similar shared knowledge question can control who can make a forum post, write on a social networking user's wall or other commenting area, comment on other items on social networking sites, etc. In the photo case, a social networking site implementation can make the person who uploaded each photo the administrator for write access, or give that authority to the people tagged in the photo, or some other set of people. Shared knowledge questions can also be used to safeguard the ability of calling a person's phone, or sending a person an email or instant message. A wiki or other shared networked document can use shared knowledge questions to prevent edits to its text. A website (such as for lawyers) can use shared knowledge questions (such as questions to which only a lawyer would likely know the answer) to prevent undesired people from registering for the site, and posting information to it.

In some photo sharing websites, a user can tag a photo with the accounts of users who appear in the photo. Sometimes, users do not want to be tagged in photos. A photo site implementation can allow a user to post shared knowledge questions that must be answered in order to tag photos of the person. This feature can help prevent unwanted tagging from people who are not trusted by the person in the photo.

If a user is storing a set of files on a network, they can require another user to answer a shared knowledge question in order to upload new files to the storage, or modify the files in that storage. For instance, an exemplary application screenshot 290 is depicted in FIG. 14. Shared knowledge questions 290, 292, 294, 296, and 298 are listed on the left side of this application screenshot. This example shows how friends can be allowed to upload more files to a safe box content 302 that was opened by a user who successfully answered shared knowledge questions 290 and 292, if the user can answer yet another shared knowledge question 298 by entering an acceptable answer in input box 300. In FIG. 14, "Add to this box" button 304 is included. In this implementation, clicking the "Add to this box" button displays additional shared knowledge question 298 for the viewing user to answer, and then if answered correctly, displays a file chooser dialog box (not shown in this screenshot). (However, note that this method of requiring a shared knowledge test before providing "write access" for uploading can also be implemented in web pages where read access is not protected by shared knowledge, such as a traditional wiki.) In order to allow the sharer to specify the shared knowledge question(s) that must be answered before uploading, the sharer's interface in this implementation (as shown in the example of FIG. 12) is extended with additional text fields for the shared knowledge question and accepted answers that must be entered for others to upload to the currently displayed Safe box. A new or existing shared knowledge question can protect commenting on files within the Safe box. Alternatively, the same shared knowledge question(s) and question answering process and interface can be used to provide both viewing (or read) access and writing access to resources or file(s)/locations, allowing anyone who has answered the shared knowledge question(s) to view, upload, and modify or comment on the files.

An email system can require shared knowledge questions to be answered in order to send an email to a user. To reiterate, the shared knowledge question in this case does not protect the ability to view anything, but rather to add (or write) new data into an email inbox. For instance, each email user can specify a shared knowledge question (or set of shared knowledge questions, using any of the techniques described herein), and if another user sends that user an email from an email address (or using other identification such as a digital signature, IP address, and/or cryptographic key) that is not yet "allowed," the system can require the sender to answer a shared knowledge question first, before the email will be allowed. Alternatively, the email system can require the sender to answer a shared knowledge question before being able to even start writing the email. Shared knowledge questions can also be required for instant message conversation initiation, initiating phone calls, leaving voice mail, paging, or any other type of information transmission to a user.

Rather than completely blocking messages or other information transmissions, uploads, posts, or general write accesses, a system can just prioritize those that are initiated by a user who has answered particular shared knowledge questions. For instance, emails sent by people who have not answered shared knowledge questions and/or are not known by the system can appear in a bulk "potential spam" folder. Messages that are sent by users who have answered specific shared knowledge questions can be highlighted or in some other way presented differently with indicia to make them stand out to the user. Files that have been uploaded by users who have not answered questions can automatically be deleted after an amount of time, or when available memory space reaches some predefined limit.

Shared knowledge questions can be used to replace or augment the existing write access controls in computer systems such as "database write access" and "file system write access." The question interface can just be used in place of or in addition to the existing (generally textual or graphical access control list) interfaces for these systems. The preceding discussion has highlighted only a few of the many other applications of this novel technology and is not intended to imply any limit on its use. Many more applications and features will become evident, given the information presented herein.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for using a computing device to control access to a resource, wherein the access includes one or more of perceiving, modifying, creating, adding to, or deleting the resource, comprising the steps of:
   (a) enabling a user desiring to provide access to the resource by a specific group of one or more persons who can interact with the computing device, to specify a shared knowledge question and to indicate one or more acceptable answers to the shared knowledge question, wherein the user creates the shared knowledge question so that only the specific group of one or more persons are likely to know an acceptable answer to the shared knowledge question;
   (b) enabling a person desiring to access the resource, the person being different than the user, to be presented with the shared knowledge question and to respond by entering a proposed answer to the shared knowledge question;
   (c) using the computing device to automatically employ an inexact matching procedure to determine if the proposed answer at least inexactly matches any of the one or more acceptable answers sufficiently to enable the person to access the resource; and
      (i) if so, enabling the person to access the resource; else,
      (ii) if not, denying the person access to the resource.

2. The method of claim 1, wherein the step of using the computing device to automatically employ an inexact matching algorithm comprises at least one of the steps of:
   (a) automatically ignoring word variations between any of the one or more acceptable answers and the proposed answer, as defined by linguistic dimensions;
   (b) automatically ignoring at least one extra word, if included in the proposed answer but not included in any of the one or more acceptable answers; and
   (c) ignoring an order of plural words appearing in the proposed answer, so long as each word included in any of the one or more acceptable answers has a corresponding word in the proposed answer.

3. The method of claim 2, wherein the step of automatically ignoring word variations between any of the one or more acceptable answers and the proposed answer comprises the step of determining if any of one or more words in a proposed answer is a misspelling of a word in any of the one or more acceptable answers.

4. The method of claim 2, wherein the step of automatically ignoring at least one extra word if included in the proposed answer is carried out only if the proposed answer also includes each word comprising any one of the one or more acceptable answers.

5. The method of claim 1, further comprising the step of determining an indication of an identity of a person attempting to access the resource by answering the shared knowledge question, without requiring the person to input a name or other identification at or before that time.

6. The method of claim 5, wherein the step of determining the indication of the identity of the person comprises at least one of the steps of:
   (a) automatically determining that the person has attempted to access the resource from an online account that is confirmed by the user as being authorized to guess an answer to the shared knowledge question, wherein the online account is associated with and indicates the identity of the person;
   (b) automatically accessing a web browser cookie that is stored on a computing device being used by the person, the web browser cooking indicating the identity of the person; and
   (c) automatically determining an Internet protocol (IP) address of the person who is attempting to access the resource, the IP address being associated with and indicating the identity of the person.

7. The method of claim 1, further comprising the steps of:
   (a) determining an indication of an identity of each person who attempts to access the resource; and
   (b) automatically maintaining an access log that includes a record of each attempt to access the resource, wherein the record includes the indication of the identity of the person making the attempt.

8. The method of claim 7, further comprising the steps of automatically imposing limits related to the number of incorrect proposed answers input by one or more persons to one or more shared knowledge questions; and, based upon the number of incorrect proposed answers that exceed a limit, taking an action that affects further input of proposed answers.

9. The method of claim 8, further comprising at least one of the steps of:
(a) if a total number, Ig, of incorrect proposed answers made by any person having an indicated identity g, for all shared knowledge questions for which the person input a proposed answer exceeds a first predetermined limit Xg, disallowing any more attempts by the person having the indicated identity g, to input a proposed answer for any shared knowledge question;
(b) if a number, Igq, of incorrect proposed answers made by the person having the indicated identity g, for a specific shared knowledge question q exceeds a second predetermined limit Xgq, disallowing any further attempts by the person having the indicated identity g to input a proposed answer for the specific shared knowledge question q by any person having the indicated identity g; and
(c) if a number Iq of incorrect proposed answers made by any person for the specific shared knowledge question q exceeds a third predetermined limit Xq, disallowing any further attempts by any person to input a proposed answer to the specific shared knowledge question q.

10. The method of claim 7, further comprising the steps of:
(a) using data in the access log that indicates an identity of the user who specified the shared knowledge question, and the indicated identity of each person who input an acceptable answer to the shared knowledge question, determining a measure of a number of successful attempts by one or more persons to answer shared knowledge questions specified by the user, by input of acceptable proposed answers; and
(b) using the computing device for determining a degree of relation function between the user and each person based in part on the number of successful attempts by the person to input an acceptable proposed answer to the shared knowledge questions of the user.

11. The method of claim 10, further comprising the step of using the computing device for determining the degree of relation between the user and a person, based in part on a number of successful attempts by the user to input an acceptable proposed answer to each of one or more shared knowledge questions that have been specified by the user to control access to one or more resources of the person.

12. The method of claim 11, further comprising the step of employing the degree of relation between the user and persons, using the computing device to automatically carry out at least one of the steps selected from the group of steps consisting of:
(a) determining whether to display information about one or more persons to the user based upon the degree of relation of each person to the user;
(b) determining whether an indication will be activated and presented to the user in regard to information received from one or more persons, based upon the degree of relation of each person to the user;
(c) determining a sort order for presenting items received from a plurality of persons based upon the degree of relation of each person to the user;
(d) combining the degree of relation with a different statistic to produce a parameter used to determine an action that is taken in regard to information presented to the user;
(e) identifying persons who are more trusted than others by the user, based upon the degree of relation of each person to the user; and
(f) defining social hubs that include the user and the plurality of persons, based upon the degree of relation between the user and the plurality of persons.

13. The method of claim 11, further comprising the step of using the computing device for applying a weighting function to shared knowledge questions for use in determining the degree of relation.

14. The method of claim 1, further comprising the step of using the same shared knowledge question to control access to a plurality of different resources at different sites accessible over a network.

15. The method of claim 1, further comprising the step of reusing a shared knowledge question that is part of a set of shared knowledge questions to which a person has previously input a proposed answer determined to be acceptable, when the person subsequently attempts to access the resource, in combination with at least one other shared knowledge question, wherein the shared knowledge question that is reused and at least the one other shared knowledge question must all be answered correctly, to determine if the person will be allowed access to the resource.

16. The method of claim 1, wherein a site includes a plurality of resources for which the user has chosen a plurality of shared knowledge questions for use by the computing device in determining the persons who are granted access to the resources, further comprising the step of enabling the user to associate one or more of the shared knowledge questions respectively with one or more specific resources, but without indicating to a person the resource to which the person will be granted access if the proposed answer input to any of the shared knowledge questions is acceptable, thereby effectively hiding the resource to which the person will be granted access until the proposed answer input by the person is determined by the computing device to be correct.

17. The method of claim 1, further comprising the steps of using the computing device for:
(a) automatically evaluating the shared knowledge question specified by the user to determine a likelihood that a person might be able to guess a proposed answer that is acceptable without actually having knowledge of any acceptable answer; and
(b) presenting a value that is indicative of said likelihood, to the user who is specifying the shared knowledge question, to provide a warning if it appears that the user has specified a shared knowledge question to which it is easy to guess a correct answer.

18. The method of claim 17, wherein the step of automatically evaluating comprises at least one step selected from a group of steps consisting of:
(a) determining if the acceptable answer to the shared knowledge question is a member of a set having only readily enumerable members;
(b) determining if the acceptable answer is readily discoverable by searching publicly available data; and
(c) determining if the shared knowledge question is included in a predefined database of easily answered shared knowledge questions.

19. The method of claim 1, further comprising the step of using the computing device for automatically suggesting a shared knowledge question to the user by carrying out one of the steps of:
(a) suggesting a category of shared knowledge questions based upon data that have been compiled about the user or about persons who have been identified as friends of the user;

(b) suggesting a shared knowledge question based upon data that have been compiled about the user or about the persons who have been identified as friends of the user;
(c) identifying interests of the user as a basis for suggesting a shared knowledge question;
(d) suggesting a shared knowledge question targeted to content that have been uploaded or downloaded by the user over a network; and
(e) suggesting a shared knowledge question derived from a database of shared knowledge questions that correspond to interests and activities of the user.

20. The method of claim 1, further comprising the steps of using the computing device for:
(a) enabling the user to specify a plurality of shared knowledge questions for controlling access to one or more resources; and
(b) enabling the user to specify at least one option selected from the group of options consisting of:
    (i) a plurality of specific shared knowledge questions that must all be answered correctly by a person to gain access to one or more resources;
    (ii) a Boolean combination of shared knowledge questions that must be answered correctly by a person to gain access to the one or more resources; and
    (iii) a portion that is less than all of a plurality of shared knowledge questions that must be answered correctly by a person to gain access to the one or more resources.

21. A non-transitory memory medium storing machine readable and executable instructions for use in controlling access to a resource, by carrying out a plurality of functions when the machine readable and executable instructions are executed on a computing device, wherein the access includes one or more of perceiving, modifying, creating, adding to, or deleting the resource, the plurality of functions including:
(a) enabling a user desiring to provide access to the resource by a specific group of one or more persons, to specify a shared knowledge question and to indicate one or more acceptable answers to the shared knowledge question, wherein the user creates the shared knowledge question so that only the specific group of one or more persons are likely to know an acceptable answer to the shared knowledge question;
(b) enabling a person desiring to access the resource, the person being different than the user, to be presented with the shared knowledge question and to respond by entering a proposed answer to the shared knowledge question;
(c) automatically employing an inexact matching procedure to determine if the proposed answer at least inexactly matches any of the one or more acceptable answers sufficiently to enable the person access to the resource; and
    (i) if so, enabling the person access to the resource; else,
    (ii) if not, denying the person access to the resource.

22. A method for using a computing device for controlling access to resources, wherein the access includes one or more of perceiving, modifying, creating, adding to, or deleting the resource, and in connection therewith, determining a degree of relation between parties accessing the resources, comprising the steps of:
(a) specifying shared knowledge questions and specifying one or more acceptable answers to each shared knowledge question, where each shared knowledge question is associated with a resource and is selected so that a group of one or more parties who are intended to be able to access the resource are likely to have knowledge of an acceptable answer to the shared knowledge question;
(b) enabling parties to enter proposed answers to shared knowledge questions that are each associated with specific resources;
(c) using the computing device for determining if the proposed answers that are entered by the parties are acceptable answers, and if so, granting access to the resources with which the shared knowledge questions answered by the parties are associated; and
(d) determining a degree of relation function between the user and a specific party who has attempted to access one or more resources by entering a proposed answer to each of one or more shared knowledge questions of the user, where the degree of relation function is at least in part based upon a number of successful attempts by a party to access the one or more resources of the user, by correctly answering the one or more shared knowledge questions.

23. The method of claim 22, wherein the parties also share resources and control access to the resources that they are sharing by specifying shared knowledge questions that must be successfully answered by entering an acceptable proposed answer, further comprising the steps of using the computing device for:
(a) determining a number of successful attempts by the user to enter an acceptable proposed answer to a shared knowledge question of a specific party and thereby gain access to the resource of the specific party; and
(b) further determining the degree of relationship between the user and the specific party based at least in part on the number of successful attempts by the user to access one or more resources of the specific party.

24. The method of claim 23, further comprising the step of using the computing device for applying weighting factors to the shared knowledge questions used in determining the degree of relation function.

25. The method of claim 22, further comprising the step of determining a portion of information of the user that will be shared with the specific party, based upon the degree of relation function between the user and the specific party.

26. The method of claim 22, further comprising the steps of determining whether the degree of relation function for the specific party is above a predefined threshold, and if above the predefined threshold, taking a predetermined action comprising at least one step selected from the group of steps consisting of:
(a) providing an indicia applied to data that are received from the specific party by the user, wherein the indicia is applied in a manner that is based upon the degree of relation function;
(b) determining a level of trust associated with the specific party in regard to accessing resources of the user, based upon the degree of relation function; and
(c) adding the specific party to a list of persons that is employed by the user for a desired purpose, based upon the degree of relation function.

27. The method of claim 26, further comprising the step of enabling the user to vary the predefined threshold to alter the degree of relation function that a specific party must have to access a resource of the user.

28. The method of claim 22, further comprising the step of using the degree of relation function of the specific party to determine if the specific party will be allowed access to other resources of the user.

29. The method of claim 22, further comprising the step of determining the degree of relation function for a plurality of specific parties relative to the user to determine members of a social hub.

30. A method for using a computing device for controlling access to resources over a network, wherein the access includes one or more of perceiving, modifying, creating, adding to, or deleting a resource, comprising the steps of:
(a) enabling one or more shared knowledge questions to be specified and specifying one or more acceptable answers to each shared knowledge question, where each shared knowledge question is associated with a first resource and is selected so that a specific group of one or more parties who are intended to be able to access the first resource are likely to have knowledge of an acceptable answer to the one or more shared knowledge questions;
(b) using the computing device for enabling a party attempting to access a second resource that is controlled by a different entity than that controlling the first resource to enter a proposed answer to one or more of the shared knowledge questions that are associated with the first resource, the party attempting to access the second resource being a member of the specific group of parties intended to be able to access the first resource, thereby reusing the one or more shared knowledge questions to control access to the second resource;
(c) using the computing device for determining if the one or more proposed answers that are entered by the party attempting to access the second resource are acceptable; and
  (i) if so, granting the party access to the second resource; else,
  (ii) if not, denying the party access to the second resource.

31. The method of claim 30, further comprising the step of maintaining a storage that includes the one or more shared knowledge questions, wherein the storage is accessible over a network and the one or more shared knowledge questions included in the storage are associated with one or more specific parties who have accessed the first resource by entering acceptable answers to the one or more shared knowledge questions before the shared knowledge questions are reused to control access to the second resource, the party attempting to access the second resource being a member of the one or more specific parties who have successfully accessed the first resource.

32. The method of claim 31, further comprising the step of employing the one or more shared knowledge questions that are reused to control access to the second resource only if the party attempting to access the second resource has first failed to provide a predefined password initially required to access the second resource, or if there is at least one concern about granting the party access to the second resource based on use of only a different procedure for controlling access.

33. The method of claim 32, wherein the at least one concern is selected from the group of concerns consisting of:
(a) the second resource has a substantially higher value than other resources for which access is granted based only on the different procedure;
(b) a possible fraud by the party in attempting to access the second resource has been detected; and
(c) a suspect behavior has been detected in connection with an attempt by the party to access the second resource.

34. The method of claim 31, wherein the party attempting to access the second resource originally specified the one or more shared knowledge questions used to control access to the first resource.

35. The method of claim 31, further comprising the step of using the computing device for computing a probability that acceptable answers to each of the one or more shared knowledge questions can be successfully guessed, to aid in determining how many of the shared knowledge questions must be answered successfully before the party is allowed access to the second resource.

36. A method for using a computing device for controlling access to a plurality of resources, wherein the access includes one or more of perceiving, modifying, creating, adding to, or deleting a resource, comprising the steps of:
(a) enabling a plurality of different shared knowledge questions to be specified, wherein specific subsets of the plurality of shared knowledge questions are associated with specific subsets of the plurality of resources and are selected to enable specific groups of one or more parties to access the specific subsets of the plurality of resources among the plurality of resources;
(b) using the computing device for storing one or more acceptable answers to each of the plurality of shared knowledge questions that were specified;
(c) presenting a subset of the plurality of shared knowledge questions to a person communicating with the computing device, wherein an existence of the resources with which one or more subsets of the plurality of shared knowledge questions are associated, is hidden from the person;
(d) enabling the person to enter a proposed answer to any of the plurality of shared knowledge questions presented to the person;
(e) using the computing device for determining whether each proposed answer entered by the person is an acceptable answer to the shared knowledge questions for which the proposed answer was entered; and
  (i) enabling the person access to the resource associated with any of the plurality of shared knowledge questions that the person successfully correctly answered, so that after being granted access, the existence of each resource to which the person has been granted access then becomes evident to the person; and
  (ii) denying the person access to the resources associated with any shared knowledge questions that the person failed to successfully correctly answer, so that the resources remain hidden from the person.

37. A method for using a computing device to assist in controlling access to a resource, wherein the access includes one or more of perceiving, modifying, creating, adding to, or deleting the resource, comprising the steps of:
(a) using the computing device to suggest a shared knowledge question that will be used to control access to the resource;
(b) enabling one or more acceptable answers to the shared knowledge question to be specified;
(c) determining, based at least in part on analyzing the specified acceptable answers, information associated with a user providing the acceptable answers; and
(d) presenting the shared knowledge question to a person desiring to access the resource, to control access to the resource based upon the answer provided by the person to the shared knowledge question.

38. A system for controlling access to a resource, wherein the access includes one or more of perceiving, modifying, creating, adding to, or deleting a resource, comprising:
(a) a memory in which information related to the resource or for accessing it, and machine executable instructions are stored;

(b) an interface for enabling bi-directional communication with a computing device used by a party attempting to access the resource; and
(c) a processor that is coupled to the memory and to the interface, the processor executing the machine executable instructions stored in the memory to carry out a plurality of functions, including:
   (i) facilitating a user specifying a shared knowledge question with which one or more acceptable answers are associated, the shared knowledge question being specified so that only a specific group of one or more persons is likely to know an acceptable answer to the shared knowledge question, the one or more persons within the specific group being different than the user;
   (ii) presenting the shared knowledge question to a person desiring to access the resource;
   (iii) accepting entry of a proposed answer to the shared knowledge question by the person;
   (iv) employing an inexact matching procedure to determine if the proposed answer at least inexactly matches any of the one or more acceptable answers sufficiently to enable the person access to the resource; and
      (A) if so, enabling the person access to the resource via the interface; else
      (B) if not, denying the person access to the resource.

39. A system for controlling access to resources, wherein the access includes one or more of perceiving, modifying, creating, adding to, or deleting a resource, and in connection therewith, determining a degree of relationship between parties accessing the resources, comprising:
(a) a memory in which information related to the resources or information for accessing the resources, and machine executable instructions are stored;
(b) an interface for enabling bi-directional communication with computing devices used by parties to attempt to access the resources; and
(c) a processor in communication with the memory and with the interface, the processor executing the machine executable instructions to carry out a plurality of functions, including:
   (i) facilitating specification of shared knowledge questions, and association of one or more acceptable answers to each shared knowledge question, where each shared knowledge question is also associated with a resource and is specified so that a specific group of one or more parties who are intended to be able to access the resources are likely to have knowledge of acceptable answers to the shared knowledge question;
   (ii) presenting shared knowledge questions to parties desiring to access specific resources;
   (iii) accepting entry of proposed answers to shared knowledge questions that are associated with specific resources;
   (iv) determining if the proposed answers that are entered by the parties are acceptable answers, and if so, granting access to the resources with which the shared knowledge questions answered by the parties are associated; and
   (v) determining a degree of relation function between a user and a specific party who has attempted to access one or more resources of the user by entering a proposed answer to each of one or more shared knowledge questions, where the degree of relation function is at least in part based upon a number of successful attempts by the specific party to access the one or more resources by correctly answering the one or more shared knowledge questions.

40. A system for reusing shared knowledge questions originally created for controlling access to a first resource to be used for controlling access to a second resource, wherein the access includes one or more of perceiving, modifying, creating, adding to, or deleting a resource, comprising:
(a) a memory in which information related to the second resource or for accessing it, and machine executable instructions are stored;
(b) an interface for enabling bi-directional communication with computing devices used by parties to attempt to access the second resource; and
(c) a processor that is coupled to the memory and to the interface, the processor executing the machine executable instructions stored in the memory to carry out a plurality of functions, including:
   (i) using the interface to access data at a different site, where the data at the different site were produced as a result of a first user specifying one or more shared knowledge questions that are each associated with one or more acceptable answers, wherein each shared knowledge question is associated with a first resource and is selected so that specific groups of one or more of the parties who are intended to be able to access the first resource are likely to have knowledge of an acceptable answer to the one or more shared knowledge questions;
   (ii) enabling a party attempting to access the second resource to enter a proposed answer to each of the one or more shared knowledge questions that are associated with the first resource, the party attempting to access the second resource being a member of the specific group of parties intended to be able to access the first resource, thereby reusing the one or more shared knowledge questions to control access to the second resource;
   (iii) determining if the one or more proposed answers that are entered by the party attempting to access the second resource are acceptable; and
      (A) if so, granting the party access to the second resource; else,
      (B) if not, denying the party access to the second resource.

41. A system for controlling access to a plurality of resources, wherein the access includes one or more of perceiving, modifying, creating, adding to, or deleting a resource, comprising:
(a) a memory in which information related to the plurality of resources or information for accessing the plurality of resources, and machine executable instructions are stored;
(b) an interface for enabling bi-directional communication with computing devices used by parties to attempt to access the plurality of resources; and
(c) a processor in communication with the memory and with the interface, the processor executing the machine executable instructions to carry out a plurality of functions, including:
   (i) facilitating specification of a plurality of different shared knowledge questions, wherein specific subsets of the shared knowledge questions are associated with specific subsets of the plurality of resources and are selected to enable specific groups of one or more parties to access the specific subsets of the plurality of resources, wherein each shared knowledge question is associated with one or more acceptable answers;

(ii) presenting a subset of the plurality of shared knowledge questions to a person communicating with the processor through the interface, wherein an existence of the specific resource with which subset of the plurality of shared knowledge questions is associated, is hidden from the person;

(iii) accepting entry by the person of a proposed answer to any of the plurality of shared knowledge questions that have been presented to the person;

(iv) determining whether each proposed answer entered by the person is an acceptable answer to the shared knowledge questions for which the proposed answer was entered; and (A) enabling the person access to the resource associated with each of the plurality of shared knowledge questions that the person successfully answered, so that after being granted access, the existence of each resource to which the person has been granted access becomes evident to the person; and (B) denying the person access to the resource associated with any shared knowledge questions that the person failed to successfully answer, so that the resource remains hidden from the person.

\* \* \* \* \*